(12) United States Patent
Armbruster et al.

(10) Patent No.: US 12,319,332 B2
(45) Date of Patent: Jun. 3, 2025

(54) CLEANING SYSTEM COMPRISING AT LEAST ONE HAND-GUIDED CLEANING CART AND TWO OR MORE FUNCTIONAL DEVICES

(71) Applicant: ALFRED KÄRCHER SE & CO. KG, Winnenden (DE)

(72) Inventors: Patrick Armbruster, Winnenden (DE); Jochen Burchard, Winnenden (DE); Denis Dammköhler, Winnenden (DE); Kamila Dobler, Winnenden (DE); Beyza Guegercin, Winnenden (DE); Marten Jahn, Winnenden (DE); Jens Kuhn, Winnenden (DE); Calogero Maniscalco, Winnenden (DE)

(73) Assignee: ALFRED KÄRCHER SE & CO. KG, Winnenden (DE)

( * ) Notice: Subject to any disclaimer, the term of this patent is extended or adjusted under 35 U.S.C. 154(b) by 240 days.

(21) Appl. No.: 18/050,374

(22) Filed: Oct. 27, 2022

(65) Prior Publication Data
US 2023/0182799 A1   Jun. 15, 2023

Related U.S. Application Data

(63) Continuation of application No. PCT/EP2021/059406, filed on Apr. 12, 2021.

(30) Foreign Application Priority Data

Apr. 29, 2020  (DE) .................... 10 2020 111 725.6

(51) Int. Cl.
*B62B 5/06*   (2006.01)
*A47L 13/512*  (2006.01)
*B62B 3/04*   (2006.01)

(52) U.S. Cl.
CPC ............ *B62B 5/066* (2013.01); *A47L 13/512* (2013.01); *B62B 3/04* (2013.01); *B62B 2202/50* (2013.01)

(58) Field of Classification Search
CPC ....... B62B 5/066; B62B 3/04; B62B 2202/50; B62B 2207/00; B62B 3/003; B62B 3/005;
(Continued)

(56) References Cited

U.S. PATENT DOCUMENTS 2,754,974 A * 7/1956 Larson .................. A47L 13/512
248/222.12
5,687,856 A * 11/1997 Kendrena ............. A47L 13/512
211/94.01
(Continued)

FOREIGN PATENT DOCUMENTS

AU   2018363192   4/2020
CA   3067845      1/2019
(Continued)

OTHER PUBLICATIONS

Translated copy of CN-209126753-A (Year: 2024).*
(Continued)

*Primary Examiner* — James A Shriver, II
*Assistant Examiner* — Ian Bryce Shelton
(74) *Attorney, Agent, or Firm* — Sheridan Ross P.C.

(57) ABSTRACT

A cleaning system comprising a hand-guided cleaning cart having rollers that is movable over a supporting surface, for transporting and storing cleaning utensils for manual cleaning is provided. The cleaning system also has at least one receiving device arranged along the cleaning cart and two or more different functional devices for operation and/or use of the at least one cleaning cart. The functional devices are selectively connectable to the at least one receiving device, such that the at least one receiving device and the functional
(Continued)

devices may be considered cooperating connecting elements.

41 Claims, 12 Drawing Sheets

(58) Field of Classification Search
CPC ......... B62B 5/061; B62B 5/067; B62B 3/008; A47L 13/512; A47L 13/51
See application file for complete search history.

(56) References Cited

U.S. PATENT DOCUMENTS

| | | | | |
|---|---|---|---|---|
| 5,727,697 | A * | 3/1998 | Ricciardelli | A47F 7/0028 248/225.11 |
| 6,264,216 | B1 | 7/2001 | Wilson | |
| 6,626,402 | B1 * | 9/2003 | Kaminstein | A46B 17/02 248/314 |
| 7,017,936 | B2 * | 3/2006 | Huang | B62B 9/20 280/654 |
| 7,658,390 | B2 * | 2/2010 | Martin | B62B 5/06 16/422 |
| 8,419,024 | B1 | 4/2013 | Arroyo-Ferrer | |
| 9,216,751 | B2 * | 12/2015 | Adams | B62B 3/005 |
| 9,980,623 | B2 * | 5/2018 | Menzel | F16B 12/26 |
| 10,034,594 | B2 * | 7/2018 | Menzel | F16B 12/125 |
| 10,246,116 | B2 * | 4/2019 | Oltman | B62B 5/06 |
| 10,427,702 | B2 * | 10/2019 | Phillips | B62B 3/02 |
| 11,332,177 | B2 * | 5/2022 | Lucas | B62B 3/10 |
| 2002/0109318 | A1 | 8/2002 | Calmeise et al. | |
| 2006/0027984 | A1 * | 2/2006 | Huang | B62B 9/20 280/47.371 |
| 2006/0163827 | A1 | 7/2006 | Lauer et al. | |
| 2006/0186642 | A1 | 8/2006 | Kady | |
| 2008/0296866 | A1 * | 12/2008 | Martin | B62B 5/06 280/304.5 |
| 2011/0198974 | A1 * | 8/2011 | Menzel | B62B 3/02 312/249.11 |
| 2011/0221147 | A1 * | 9/2011 | Hatcher | B62B 5/06 16/421 |
| 2013/0307238 | A1 | 11/2013 | Campbell et al. | |
| 2014/0190077 | A1 * | 7/2014 | Burmann | B65D 19/42 220/4.01 |
| 2014/0375004 | A1 | 12/2014 | Adams et al. | |
| 2015/0097348 | A1 * | 4/2015 | Steinfels | F16M 11/2092 280/47.35 |
| 2016/0068176 | A1 * | 3/2016 | Adams | A47L 13/512 280/47.35 |
| 2017/0254472 | A1 * | 9/2017 | Forsberg | B25G 3/20 |
| 2017/0356593 | A1 | 12/2017 | Churchvara et al. | |
| 2018/0103820 | A1 * | 4/2018 | Menzel | B62B 3/02 |
| 2018/0111635 | A1 * | 4/2018 | Oltman | B62B 3/10 |
| 2019/0111956 | A1 * | 4/2019 | Phillips | B62B 5/0461 |
| 2020/0247444 | A1 * | 8/2020 | Lucas | B62B 3/02 |

FOREIGN PATENT DOCUMENTS

| | | | | |
|---|---|---|---|---|
| CN | 102196757 | | 9/2011 | |
| CN | 107898406 | A * | 4/2018 | ......... A47L 13/512 |
| CN | 209126753 | | 7/2019 | |
| CN | 209126753 | U * | 7/2019 | |
| DE | 3021098 | | 12/1981 | |
| DE | 8305946 | | 10/1983 | |
| DE | 19504771 | | 8/1995 | |
| DE | 19504771 | A1 * | 8/1995 | ............ A47L 13/51 |
| DE | 29805778 | | 9/1999 | |
| DE | 29805778 | U1 * | 9/1999 | ........ A47G 25/0678 |
| DE | 69817440 | | 6/2004 | |
| DE | 102015106516 | | 11/2016 | |
| DE | 102015106516 | A1 * | 11/2016 | |
| EP | 1190664 | A2 * | 3/2002 | ......... A47L 13/512 |
| EP | 3072776 | | 9/2016 | |
| EP | 3095668 | | 11/2016 | |
| EP | 3095668 | A1 * | 11/2016 | |
| EP | 3453587 | | 3/2019 | |
| EP | 3564092 | | 11/2019 | |
| FR | 2842486 | | 1/2004 | |
| GB | 2279235 | A * | 1/1995 | ............ A47B 81/02 |
| GB | 2497132 | | 6/2013 | |
| GB | 2497132 | A * | 6/2013 | ............ A47L 13/51 |
| JP | 2010-112538 | | 5/2010 | |
| JP | 2010112538 | A * | 5/2010 | |
| KR | 20180029808 | A | 3/2018 | |
| WO | WO 85/00132 | | 1/1985 | |
| WO | WO 2005/042212 | | 5/2005 | |
| WO | WO 2019/092074 | | 5/2019 | |
| WO | WO-2020044340 | A1 * | 3/2020 | ......... A47L 13/512 |

OTHER PUBLICATIONS

Translated copy of DE-102015106516-A1 (Year: 2024).*
Translated copy of DE-29805778-U1 (Year: 2024).*
International Search Report for International (PCT) Patent Application No. PCT/EP2021/059406, dated Jul. 19, 2021, 16 pages.
Search Report for German Patent Application No. 10-2020-111725.6, dated Apr. 29, 2020, 5 pages.

* cited by examiner

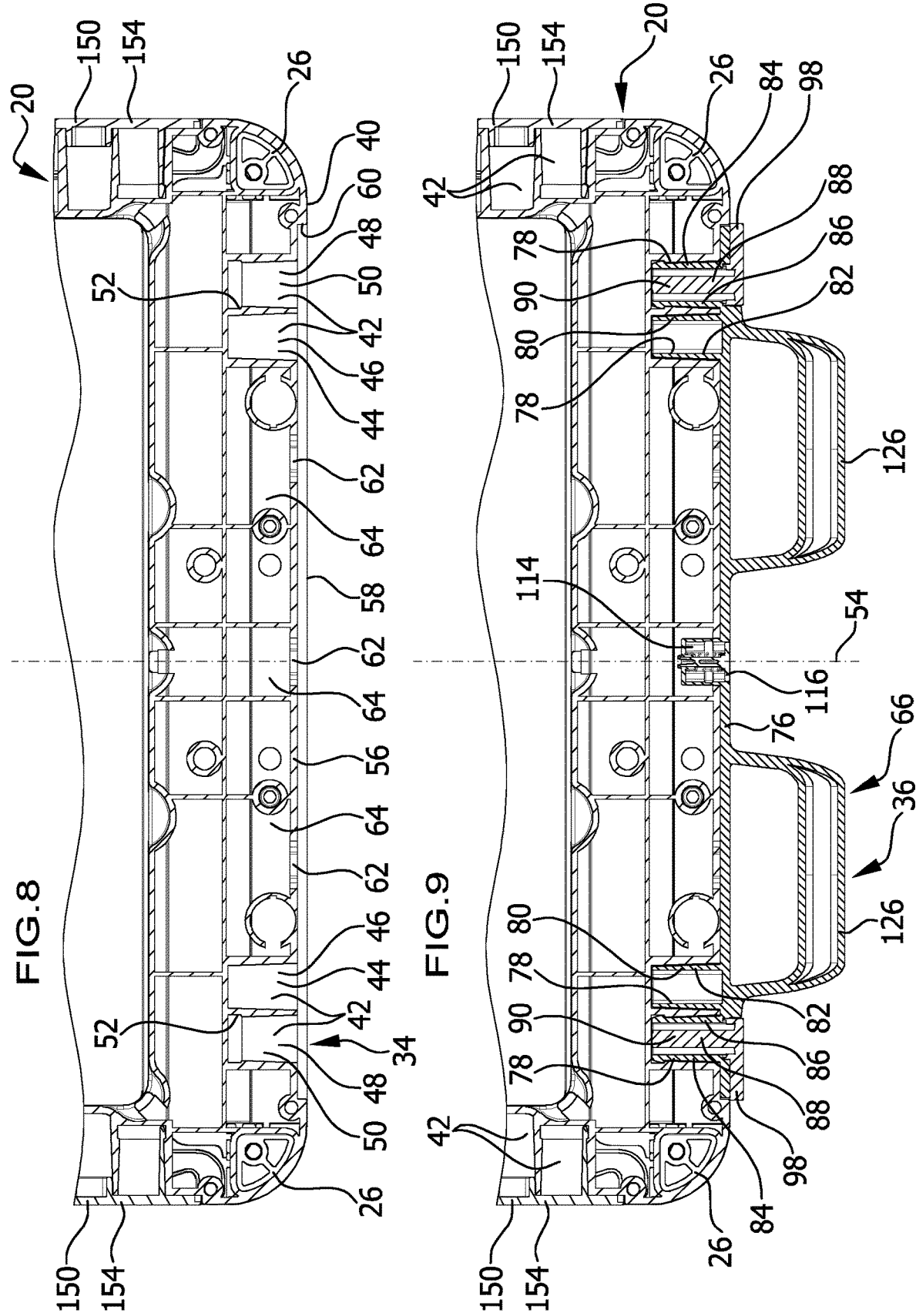

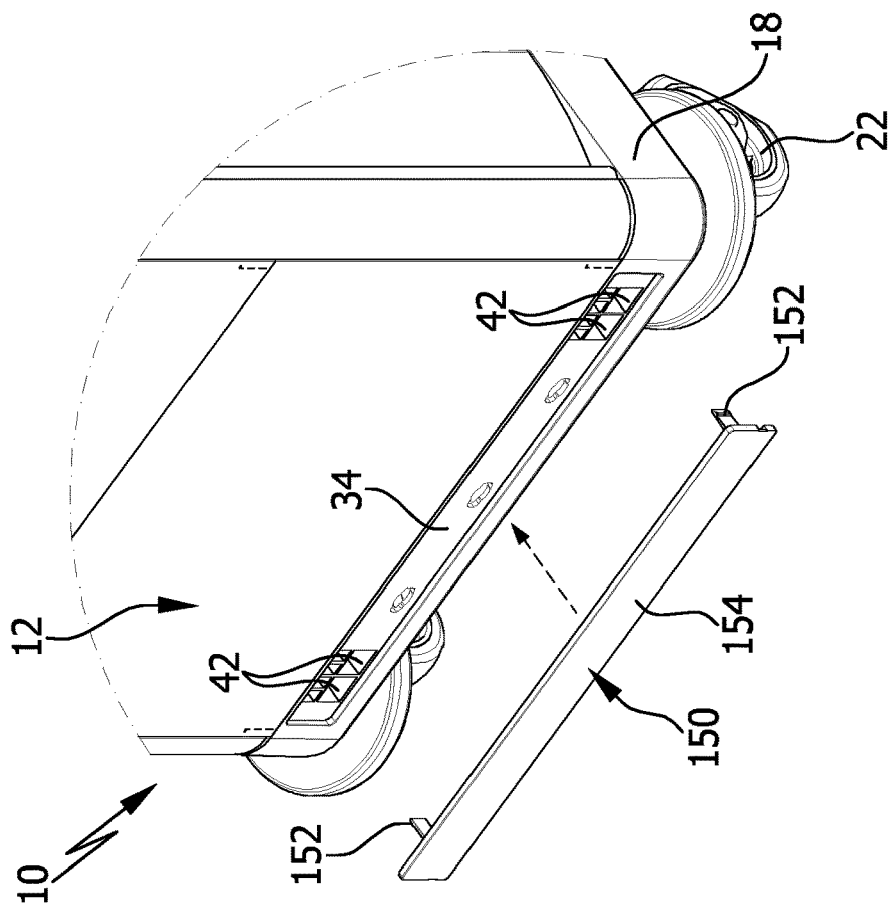
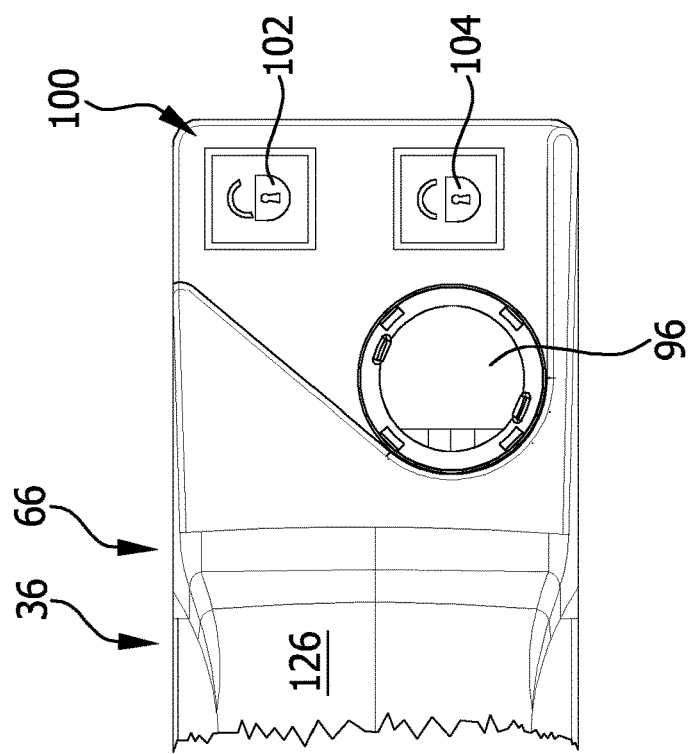

CLEANING SYSTEM COMPRISING AT LEAST ONE HAND-GUIDED CLEANING CART AND TWO OR MORE FUNCTIONAL DEVICES

CROSS-REFERENCE TO RELATED APPLICATIONS

This application is a continuation application of international application number PCT/EP2021/059406, filed on Apr. 12, 2021, and claims the benefit of German application number 10 2020 111 725.6, filed on Apr. 29, 2020, which are incorporated herein by reference in their entirety and for all purposes.

FIELD OF THE INVENTION

The present invention relates to a cleaning system comprising a hand-guided cleaning cart which comprises rollers and is movable over a supporting surface, for transporting and storing cleaning utensils for manual cleaning.

BACKGROUND OF THE INVENTION

Despite modern cleaning machines, in particular in the field of interior cleaning, some of which can be automated, cleaning carts are of great importance in the field of daily cleaning. A particular emphasis is on cleaning tasks that are to be manually performed in larger buildings, such as office buildings, hotels, nursing facilities, hospitals, airports, event buildings, or the like. The cleaning carts serve to carry cleaning utensils. Examples of these include, in particular, manually guided cleaning machines (vacuums, cordless brooms, hard floor cleaners, brush vacuum cleaners . . . ), or cleaning tools, receptacles for storing cleaning accessories, cleaning liquids or cleaning chemicals, receptacles for holding dirty liquid or waste, cleaning cloths, or other items for surface cleaning. The cleaning carts comprise rollers so that they can be moved by a user over a supporting surface.

An object underlying the present invention is to provide a cleaning system that has increased versatility.

SUMMARY OF THE INVENTION

In an aspect of the invention, a cleaning system is provided. The cleaning system comprises a hand-guided cleaning cart which comprises rollers and is movable over a supporting surface, for transporting and storing cleaning utensils for manual cleaning. The cleaning system further comprises at least one receiving device arranged at the cleaning cart and two or more different functional devices for operation and/or use of the at least one cleaning cart. The functional devices are selectively connectable to the at least one receiving device. The at least one receiving device and the functional devices comprise cooperating connecting elements.

BRIEF DESCRIPTION OF THE DRAWINGS

The foregoing summary and the following description may be better understood in conjunction with the drawing figures, of which:

FIG. 8 illustrates a sectional representation along line 8-8 of FIG. 7, showing a sectional view of a receiving device at the frame part;

FIG. 9 illustrates a representation corresponding to FIG. 8, wherein the handle device of FIG. 3 is connected to the receiving device;

FIG. 12 illustrates, in a partial view, an enlarged representation of detail A of FIG. 5;

FIG. 13 illustrates a perspective partial representation of a cleaning cart of the cleaning system, and a cover device in the process of being connected to a receiving device;

DETAILED DESCRIPTION OF PREFERRED EMBODIMENTS OF THE INVENTION

Figure 1:
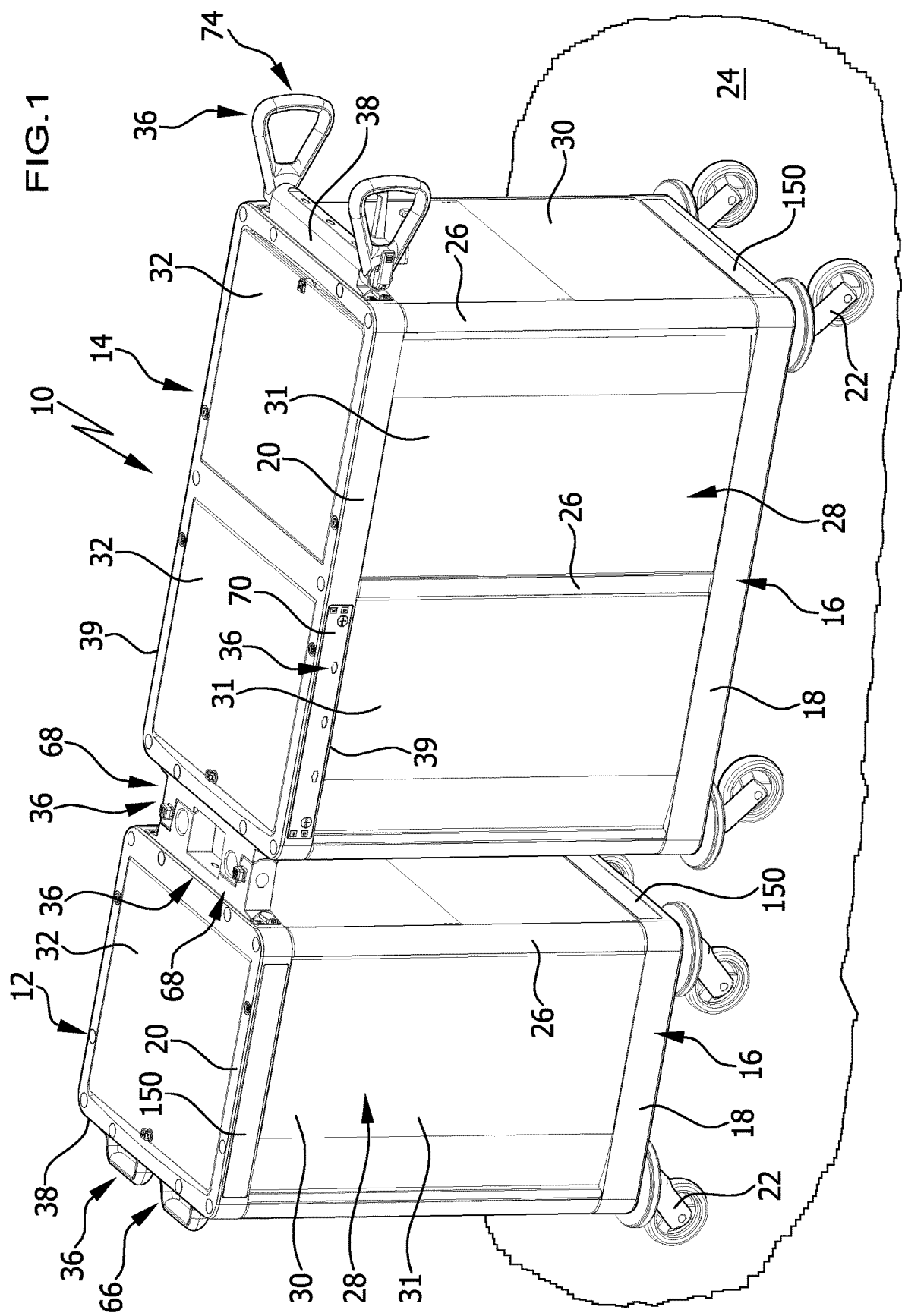
FIG. 1 illustrates, in perspective representation, a preferred embodiment of the cleaning system in accordance with the invention, comprising two cleaning carts and a plurality of functional devices.

Although the invention is illustrated and described herein with reference to specific embodiments, the invention is not intended to be limited to the details shown. Rather, various modifications may be made in the details within the scope and range of equivalents of the claims and without departing from the invention.

The present invention relates to a cleaning system comprising a hand-guided cleaning cart which comprises rollers and is movable over a supporting surface, for transporting and storing cleaning utensils for manual cleaning, wherein the cleaning system comprises at least one receiving device arranged at the cleaning cart and two or more different functional devices for operation and/or use of the at least one cleaning cart, wherein the functional devices are selectively connectable to the at least one receiving device, and wherein the at least one receiving device and the functional devices comprise cooperating connecting elements.

The cleaning cart in accordance with the invention comprises a receiving device. Two or more different functional devices are provided. The functional devices can be selectively connected to the receiving device via respective cooperating connecting elements. For example, this gives the possibility of providing, during manufacture and/or setup of the cleaning cart, different configurations of the cleaning cart which will depend on the choice of the respective functional device, by use of only one receiving device. The cleaning system has thereby proven to be particularly versatile because separate receiving devices need not be provided. This reduces the number of components required for the different configurations of the cleaning cart, thereby preferably allowing manufacturing costs to be reduced.

In particular, the cleaning system in accordance with the present invention can comprise more than one hand-guided cleaning cart. For example, two or more cleaning carts are provided. Two or more cleaning carts of the at least two cleaning carts can be of different configuration or can be of identical configuration.

In particular, it can be advantageous for the different functional devices to be releasably connectable to the at least one receiving device by having the connecting elements at the receiving device and at the functional devices be releasably connectable to one another. This enhances the versatility of the cleaning system. For example, depending on the cleaning task to be performed and its attendant cleaning utensils that are to be carried along, and/or user preferences, the user can swap out one functional device for another. This can preferably be accomplished when the cleaning cart is operating.

It is advantageous in particular for the two or more functional devices to be connected to the at least one receiving device by hand and/or without tools and/or for the two or more functional devices to be released from the at least one receiving device by hand and/or without tools.

It can be advantageous for the cleaning system to comprise more than two different functional devices. This increases the cleaning system's versatility in which the at least one cleaning cart can selectively be equipped with one of the more than two functional devices.

It can be advantageous for the cleaning system to comprise a plurality of identically configured functional devices. This can be advantageous, for example, where the cleaning system comprises more than two cleaning carts that are to be equipped with identically configured functional devices.

Alternatively or in addition, provision can be made for a cleaning cart to be equipped with two or more identically configured functional devices.

It can be advantageous for the cleaning system to comprise two or more cleaning carts and for at least one receiving device to be arranged at the respective cleaning cart, wherein at least one of the functional devices is selectively connectable to a receiving device of one of the cleaning carts. In this way, the cleaning system is rendered highly versatile. The user can attach, preferably releasably attach, the functional device to the designated, best suited or preferred cleaning cart as desired, preferred and/or needed.

Preferably, receiving devices of the two or more cleaning carts are of identical configuration.

Provision can be made for two or more different functional devices to be associated with a respective cleaning cart for operation and/or use of the respective cleaning cart.

It is advantageous for the functional devices to comprise at least one handle device having at least one, and preferably two, handle elements for the user. Via the handle device, the cleaning cart can be moved on the supporting surface in a user-friendly manner.

By way of example, a handle device can be provided in which the at least one handle element is arranged at the functional device in a non-movable manner. For example, said handle device comprises two non-movable handle elements.

Alternatively or in addition, a handle device can be provided in which the at least one handle element, for example two handle elements, is adapted to be moved relative to a base element comprised by the handle device. For example, this allows the user to adjust the position of the handle element to the user's needs, whereby the user-friendliness of the cleaning system is enhanced. For example, provision can be made for height adjustment of the at least one handle element.

It can prove to be advantageous for the at least one movable handle element to be pivotable about a pivot axis relative to the base element. The pivot axis is preferably oriented parallel to a contact plane of the cleaning cart defined by the rollers. Correspondingly, with a horizontal supporting surface, the pivot axis can be oriented horizontally.

For example, the possibility exists for two handle elements of the handle device to be pivoted in common about the pivot axis, in particular for height adjustment.

Advantageously, the handle device comprises or forms a securing device for securing the handle element against movement relative to the base element. The at least one handle element adjusted to the needs of the user is thereby secured in the preferred position. This increases the user-friendliness of the cleaning system.

By way of example, a handle device can be provided in which the at least one handle element is oriented in a plane parallel to a contact plane of the cleaning cart defined by the rollers. For example, the user can vertically grasp around the handle element when adopting a horizontal hand pose.

Alternatively or in addition, for example, a handle device can be provided in which the at least one handle element is oriented in a plane transverse and in particular perpendicular to a contact plane of the cleaning cart defined by the rollers. For example, the handle element is oriented vertically with a horizontally oriented supporting surface. For example, the user can horizontally grasp around the handle element when adopting a vertical hand pose.

It is advantageous for the functional devices to comprise a coupling device for coupling the cleaning cart to a further cleaning cart of the cleaning system. By virtue of the possibility of connecting together two or more cleaning carts, the user-friendliness and versatility of the cleaning system is increased. By way of example, cleaning carts can be connected together for empty trips, i.e., mere transport with no cleaning tasks being performed. It is also conceivable that cleaning carts are equipped for the cleaning tasks they are intended to carry out at a central location, whence they are conjointly transferred to a destination where they are separated from one another. This can analogously be done after the cleaning tasks have been completed. The cleaning carts can be connected together and transferred to a central location for waste disposal and/or re-setup.

It can be advantageous for the cleaning system to comprise at least one further cleaning cart which comprises a receiving device and a functional device in the form of a coupling device which is connected to the receiving device of the further cleaning cart, and for the cleaning carts to be connectable together via the intercoupling coupling devices.

That said, it is advantageously provided for the cleaning carts to be releasably connectable together via the coupling devices.

Preferably, connecting and/or releasing can be performed without tools and/or by hand.

It is advantageous for the coupling devices and/or the receiving devices of the two cleaning carts to be of identical configuration. This facilitates manufacture of the cleaning system and helps reduce manufacturing costs. Furthermore, the ease of handling of the cleaning system is improved by virtue of the fact that identical coupling devices and/or receiving devices are used.

It is advantageous for the cleaning system to comprise at least one clamping holder for cleaning utensils which has an elastically deformable holding part that can be transferred from a holding position in which it at least partially engages behind the cleaning utensil to an expanded release position in which the cleaning utensil can be removed from the clamping holder and inserted therein. By way of the clamping holder, cleaning utensils can be fastened and carried on the cleaning cart in an easy-to-handle manner. For example, the clamping holder can be configured in the manner of a clamping holder as it is described in WO 85/00132 A1, WO 2005/042212 A1 or JP 2010-112538 A. In such clamping holders, the cleaning utensil can have applied thereto a force directed towards the holding part. The holding part snaps from the release position into the holding position, and the cleaning utensil is secured. By pulling on the cleaning utensil, the holding part snaps from the holding position into the release position, and the cleaning utensil is thereby released.

In particular, as used herein, "cleaning utensil" can encompass "cleaning tool" and vice versa.

Advantageously, the clamping holder is configured for holding long-handled cleaning tools, for example handled flat mops, handled wiping mops or brooms.

Preferably, the at least one clamping holder can be fixed or fixable to at least one functional device and/or to the at least one receiving device.

In particular, it is preferably provided for the at least one clamping holder to be releasably connectable to the at least one functional device and/or the at least one receiving device. For example, this allows a required number of clamping holders to be carried on the cleaning cart, depending on the cleaning tasks and preferences or needs of the user.

The clamping holders can have differing sizes, conforming to cleaning utensils of differing sizes.

It is advantageous for the at least one clamping holder to be connectable to and/or releasable from the receiving device and/or the functional device without tools and/or by hand.

It has proven to be advantageous for the at least one functional device and/or the at least one receiving device to comprise at least one fixing device for in particular releasably fixing the at least one clamping holder. The clamping holder can be fixed to the receiving device via the functional device and/or to the functional device.

Advantageously, here, a plurality of fixing devices is provided for the respective fixing of a clamping holder.

In particular, the possibility exists for the functional device to allow for at least one clamping holder, and preferably a plurality of clamping holders, to be attached to the receiving device and hence to the cleaning cart.

In particular, a functional device can be provided which is configured as an adapter device and has a base element to which at least one clamping holder is fixed or fixable.

To provide user-friendly handling, it can prove to be advantageous, for example, for the fixing device and a projection arranged at the at least one clamping holder to be configured to connect together in a push-and-twist type connection, wherein the projection is insertable in the fixing device in an insertion direction and lockable to the fixing device by rotation about an axis oriented in the insertion direction. For example, the push-and-twist connection allows for a bayonet style connection to be formed between the clamping holder and the fixing device for user-friendly and quick fastening of the clamping holder. Advantageously, the projection is spring-loaded in the fixing device in such a way that unintentional unlocking thereof can be obviated.

In particular, provision can be made for the fixing device to be arranged at the at least one functional device which comprises a preferably plate-shaped base element having at least one through-opening, and for the holding part, in the state of being fixed to the fixing device, and the fixing device to be arranged on sides of the base element that face away from each other, and for the projection to extend through the through-opening.

It is advantageous, in particular in combination with the last-mentioned preferred embodiment, for the at least one receiving device to comprise or form at least one recess in which the fixing device engages in a connection state of the at least one functional device to the receiving device. Here, in the fastened state of the functional device, the fixing device is inserted in the recess. This makes for a compact attachment of the at least one clamping holder to the receiving device.

It is advantageous for the cleaning system to comprise at least one holding part for cleaning utensils, which holding part has at least one hook element for suspending the cleaning utensil therefrom, wherein the at least one holding part can be fixed to the cleaning cart via at least one functional device. The versatility of the cleaning system is increased by the at least one holding part. Cleaning utensils can be suspended from the at least one hook element, and the hook element can be fixed to the cleaning cart by way of the functional device.

For example, the at least one holding part, with at least one holding section thereof, engages in a recess which is formed between the at least one functional device assuming a connection state and the cleaning cart, wherein the holding part is hangingly fixed to the functional device and/or the receiving device via the at least one holding section. For example, the holding section engages in the recess in a form-locking manner and hangs on the functional device and/or receiving device.

Advantageously, the cleaning system comprises at least one cover device which can be connected to the receiving device and which covers connecting elements arranged at the receiving device. For example, the cover device can comprise a cover element which comprises a panel for covering at least the connecting elements. Preferably, the receiving device can thereby be protected from tampering and/or ingress of dirt. For example, by covering the receiving device with no functional device attached, the cleaning cart can be imparted a more pleasing appearance.

Preferably, all connecting elements of the receiving devices can be covered via the cover element.

Preferably, the cover element is plate-shaped.

Advantageously, the at least one cover device does not project beyond an outer contour of the cleaning cart, advantageously wherein the cover device aligns with an outer contour of the cleaning cart.

Preferably, the functional devices and/or the at least one cover device are releasably connectable to the at least one receiving device. With respect to the functional devices, reference may be had to what has been described above. Preferably, the cover device can be released from the receiving device in order to attach to the cleaning cart a functional device in lieu of the cover device.

Preferably, provision can be made for at least one of the functional devices to comprise at least one blocking element by way of which the functional device is secured to the receiving device against release therefrom when the blocking element assumes a blocking position, and can be released from the receiving device when the blocking element assumes a release position. Preferably, the at least one blocking element is formed separately from connecting elements of the functional device.

In particular, the connecting elements of the at least one receiving device and of a respective functional device form a connecting device.

It is advantageous for two or more functional devices to comprise connecting elements of identical configuration. This allows for simplifying the structural configuration of the receiving device. For example, here, connecting elements can be arranged at the receiving device that can be coupled to each of the functional devices.

In practice, it can prove to be advantageous for the functional devices each to comprise a base element having a first side that faces towards the at least one receiving device and on which is arranged at least one connecting element, and a second side that faces away from the first side and on which is arranged at least one of the following:
  a handle element;
  a clamping holder for cleaning utensils;
  a locking element for connecting to a further cleaning cart, for example a locking element of a functional device held to the further cleaning cart.

It is advantageous for the at least one connecting element arranged at the at least one receiving device not to project beyond an outer contour of the cleaning cart. Accidental impact to the connecting element can thereby be prevented.

It is advantageous for the functional devices and the at least one receiving device to each comprise a plurality of functionally equivalent connecting elements. These functionally equivalent connecting elements are in each case arranged at a distance apart from each other at the receiving device and at the functional device, wherein in each case two or more connecting elements of the receiving device and of a respective functional device cooperate in the connection state thereof. By providing at least two connecting elements each at the receiving device and at the functional devices, a more reliable connection can be ensured. This is further helped by the distance between the respective connecting elements.

In particular, as used herein, "functionally equivalent" encompasses "identical".

In particular, a plurality of functionally equivalent clamping elements and/or functionally equivalent latching elements can in each case be provided at the at least one receiving device and the respective functional device.

Generally, for example, a force-locking and/or form-locking connection of a respective functional device to the at least one receiving device is advantageous.

It can be advantageous for the connecting elements to comprise at least one receptacle and to comprise, in the connection state of the at least one functional device, at least one projection engaging in the receptacle, in particular wherein the at least one receptacle is arranged at the at least one receiving device, and the at least one projection is arranged at the respective functional device.

For example, the respective projection clampingly engages in the at least one receptacle, in particular in a form-locking manner. The projection can be a latching projection which latches with a latching receptacle.

In a preferred embodiment, the connecting elements comprise clamping elements via which the at least one functional device is clampingly connected to the at least one receiving device. In particular, a tapered channel-shaped clamping receptacle and a tapered frustopyramidally shaped or frustoconically shaped clamping projection which engages in the clamping receptacle in a form-locking manner can be provided as clamping elements.

The connecting elements in a preferred embodiment can comprise latching elements via which the at least one functional device is latchingly connected to the at least one receiving device. In particular, here, a releasable latching can be provided.

For example, latching hooks and latching receptacles are provided as latching elements which are in latching engagement one with the other.

It is advantageous for the functional devices to comprise a base element, at least one latching projection which resiliently projects therefrom, and at least one blocking element which is movably and in particular rotatably held to the base element, wherein, when in a blocking position, the at least one blocking element is in contact against the latching projection and, when in a release position, the latching projection is out of contact with the blocking element. In particular, this affords the possibility of a two-stage fixing of the functional device to the receiving device. The latching projection can latch with a corresponding latching receptacle of the receiving device. The functional device is hereby already secured to the receiving device. The adjustable blocking element is additionally provided. In this way, in the blocking position of the blocking element, since the blocking element is in contact against the latching projection, the latching projection is secured against unlatching. On the other hand, unlatching is enabled in the release position of the blocking element.

It can be provided that the blocking element, when in the blocking position, applies to the latching projection a blocking force acting on the at least one receiving device, and the latching projection, when in a release position, is out of contact with the blocking element and the blocking force removed. This allows for a form-locking and at the same time force-locking connection of the latching projection to the latching receptacle.

By way of example, the at least one blocking element is pivotably held to the base element for changing from the blocking position to the release position and vice versa.

It is advantageous for a plurality of latching projections to be provided at the respective functional device which are in each case in contact against the at least one blocking element in its blocking position. For example, at least two latching projections are provided between which the blocking element is arranged. In a preferred embodiment, for example, four latching projections are provided which are positioned around the blocking element and can in each case latch with the receiving device and be secured against unlatching by way of the blocking element.

Advantageously, the functional device comprises an indicating device for a user to determine whether the at least one blocking element assumes the blocking position or the release position. This provides a simple and intuitive way for the user to determine whether the functional device is reliably connected to the receiving device. The indicating device can, for example, be of static configuration and comprise pictograms by way of which a respective position of the blocking element can be recognized.

Advantageously, the cleaning cart comprises a plurality of receiving devices which are configured identically to one another. This increases the versatility of the cleaning system. A respective functional device can selectively be connected to one of the receiving devices.

In a preferred embodiment of the invention, provision is made for the cleaning cart to comprise a frame.

By way of example, the frame can comprise a base part to which the rollers are held, and a frame part arranged above the base part and arranged at a distance apart from the base part.

By way of example, the base part can be referred to as the "frame lower part".

The frame part can be referred to as the "frame upper part", for example.

As used herein, positional and orientational terms, such as "above", "top", "below", "bottom", are to be understood to relate to an intended use of the cleaning system. In particular, here, the cleaning cart is supported via the rollers on the supporting surface, wherein the rollers are arranged at the bottom of the cleaning cart.

A corpus or a rack in particular can also be considered to be a frame in the present case.

The frame, in particular the corpus, can for example comprise or enclose a receiving space. By way of example, cleaning utensils can be received in the receiving space.

Preferably, provision can be made for the at least one receiving device to be arranged at the frame on the outer side thereof. In the present case, this can be understood to mean, in particular, that the at least one receiving device is arranged at the frame on a side thereof that faces away from the receiving space, for arrangement of the at least one functional device at the frame on the outer side thereof.

Provision can be made for at least one receiving device to be arranged at the frame part or to be formed integrally with the frame part. For example, this allows for the functional devices to be arranged on the cleaning cart at the top side thereof.

Alternatively or in addition, provision can be made for at least one receiving device to be arranged at the base part or to be formed integrally with the base part. For example, this allows for the functional devices to be arranged on the cleaning cart at the bottom side thereof.

Provision can be made for two or more receiving devices to be arranged or formed at the frame part and/or at the base part.

In particular, here, provision can be made for two receiving devices to be arranged at the frame part and/or at the base part on sides of the frame that face away from each other and/or on two sides of the frame that are adjacent to one another at an angle.

It can prove to be advantageous for the base part and/or the frame part to be rectangular-shaped in plan view and for a receiving device to be arranged on each of the four sides of the rectangle thus defined. This makes for a cleaning system having a particularly high versatility.

Preferably, the base part and/or the frame part comprises or forms at least one of the following:
  receiving elements for mounting side walls and/or doors of the cleaning cart;
  receiving elements for mounting profile elements via which the base part and the frame part are connected together.

This allows for integrating multiple functions in the base part and/or the frame part and simplifies the structural configuration of the cleaning system.

Preferably, the base part and/or the frame part is formed in one piece, in particular as a moulded plastics part.

FIG. 1 shows, in perspective representation, an advantageous embodiment of a cleaning system in accordance with the invention, generally designated by the reference numeral 10. The cleaning system 10 comprises at least one cleaning cart. In the present case, two cleaning carts 12 and 14 are provided.

The cleaning carts 12, 14 serve to receive cleaning tools and further cleaning utensils, for example receptacles for cleaning liquids, waste, packs of cleaning chemicals, cleaning cloths, and the like, not shown in the drawing. In particular, the cleaning system 10 is used in the performance of cleaning tasks that are to be manually carried out in larger buildings, for example office buildings, hotels, nursing facilities, hospitals, airports, event buildings, or the like.

The cleaning carts 12, 14 in the present case have different dimensions. In particular, in the present case, the cleaning cart 14 is about twice the size of the cleaning cart 12. Here, the cleaning cart 12 has in plan view a generally square basic shape and the cleaning cart 14 a generally rectangular basic shape. However, this is not limiting to the scope of the present invention.

A respective cleaning cart 12, 14 comprises a frame 16 which comprises a base part 18 and a frame part 20 spaced apart therefrom in a height direction. In particular, in the present case, the base part 18 is a frame lower part and the frame part 20 is a frame upper part.

As used herein, positional and orientational terms, such as "bottom" "top", "below", "above", or the like, are to be understood to relate to an intended use of the cleaning carts 12, 14. Here, a respective cleaning cart 12, 14 is positioned on a supporting surface 24 via rollers 22 held to the base part 18. A contact plane defined by the rollers 22 coincides with the plane defined by the supporting surface 24.

A respective cleaning cart 12, 14 can be moved on the supporting surface 24 via the rollers 22.

The rollers of the cleaning cart can be steered rollers or unsteered rollers.

The supporting surface 24 is assumed to be oriented horizontally, without limitation.

The frame 16 further comprises profile elements 26 by which the base part 18 and the frame part 20 are connected together, in particular at corner regions of the respective cleaning cart 12, 14.

A respective cleaning cart 12, 14 forms a corpus 28 having side walls 30 and a top wall 32. The corpus 28 encloses a receiving space in which cleaning utensils can be received. At least part of the side walls 30 can be formed by doors 31 which can be opened to access cleaning utensils in the receiving space.

Preferably, the base part 18 and the frame part 20 are one-piece constructions made from a plastics material.

The cleaning system 10 comprises at least one receiving device 34 at each cleaning cart 12, 14. A respective functional device 36 comprised by the cleaning system 10 can be connected to a respective receiving device 34 and can thereby be attached to the cleaning cart 12, 14.

In accordance with the invention, at least one cleaning cart 12, 14 and a plurality of different functional devices 36 are provided.

In the present case, the cleaning system 10 comprises a plurality of functional devices 36 for selective use on a respective cleaning cart 12, 14 and/or for selective operation of a respective cleaning cart 12, 14. The functional devices 36 are configured differently from one another with respect to their respective function and/or use, as will be explained in the following.

In the present case, it is advantageously provided for each cleaning cart 12, 14 to comprise two or more receiving devices 34. Advantageously, the receiving devices 34 of a respective cleaning cart 12, 14 are of identical configuration. In a corresponding manner, the receiving devices 34 of different cleaning carts 12, 14 are of identical configuration so that, in particular, all receiving devices 34 of the cleaning system 10 can be of identical configuration.

Correspondingly, it is preferably provided for one of the functional devices 36 to be selectively connected to one of the receiving devices 34 of the cleaning cart 12 or to one of the receiving devices 34 of the cleaning cart 14.

Advantageously, provision is made for at least one receiving device 34 to be arranged or formed at a respective frame part 20 and/or at a respective base part 18. Here, for example, it can prove to be advantageous to provide, at the frame part 20, a receiving device 34 for arranging a functional device 36 in the form of a handle device, or a coupling device, or for receiving cleaning utensils. For example, it can be advantageous to provide, at the base part 18, a receiving device 34 for arranging a functional device 36 in the form of a coupling device, or for receiving cleaning utensils.

Figure 2:
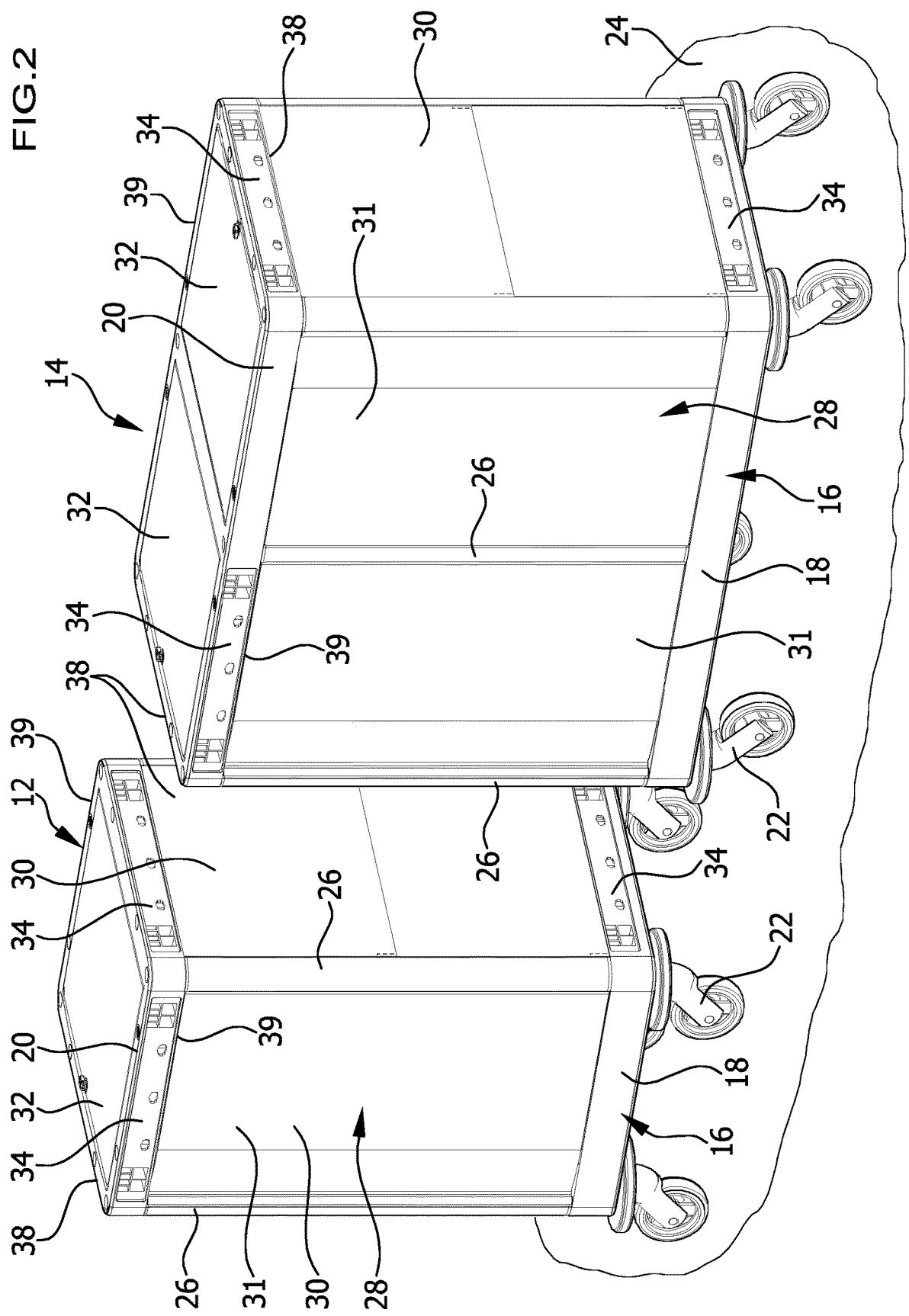
FIG. 2 illustrates a perspective representation of the cleaning carts of FIG. 1.

In the present example, the cleaning cart 12 comprises a plurality of receiving devices 34 at the frame part 20. Here, the receiving devices 34 are arranged on respective sides of the in plan view rectangularly shaped frame part 20, in particular on sides 38 thereof that face away from one another and on sides 38, 39 thereof that are arranged at an angle to one another. Of these, only one side 38 and one side 39 are visible in FIGS. 2 and 7.

The base part 18 of the cleaning cart 12 comprises receiving devices 34 on sides 38 thereof that face away from one another. Of these, only one side 38 is visible in FIG. 2.

The frame part 20 of the cleaning cart 14 comprises receiving devices 34 on sides 38 thereof that face away from each other and on sides 38, 39 thereof that are adjacent to one another at an angle. Of these, only two sides 38, 39 are visible in FIG. 2.

The base part 18 of the cleaning cart 14 comprises receiving devices 34 on sides 38 thereof that face away from each other. Of these, only one side 38 is visible in FIG. 2.

Figure 7:
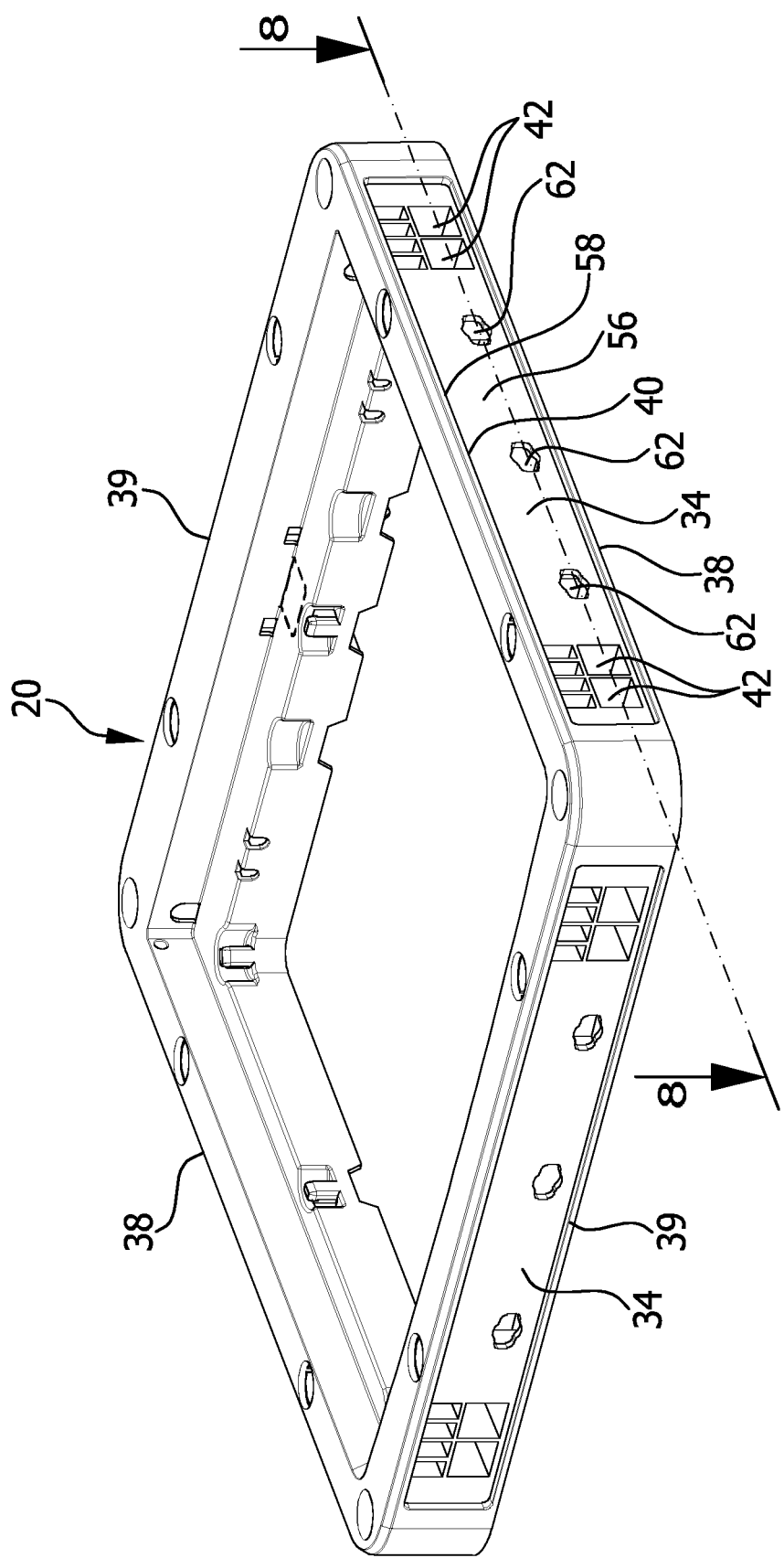
FIG. 7 illustrates a perspective representation of a frame part of a cleaning cart of the cleaning system.
Figure 10:
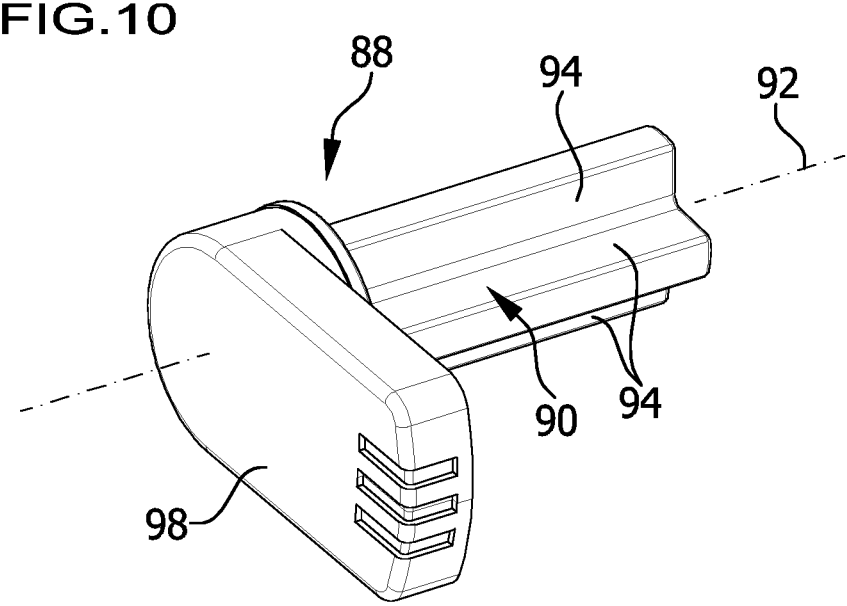
FIGS. 10 and 11 illustrate perspective representations of a blocking element of a functional device of the cleaning system.
Figure 11:
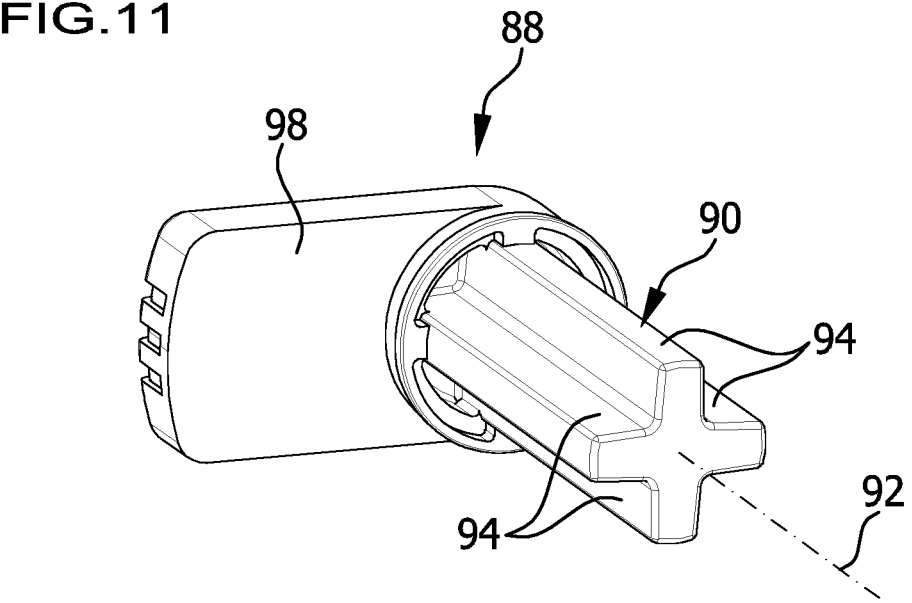

As can be seen from FIGS. 7 and 8 in particular, a respective receiving device 34 is arranged on an outer side 40 of the frame 16, and frame part 20 in particular. This applies analogously to the base part 18. The functional device 36 arranged at the receiving device 34 is thereby arranged on a side of the frame 16 that faces away from the receiving space.

The receiving device 34 comprises connecting elements 42. In the present case, two connecting elements 42 are provided, positioned at a distance apart relative to each other and functionally equivalent to one another. In particular, here, these connecting elements 42 are clamping elements 44 in the form of clamping receptacles 46. In the present example, the clamping receptacles 46 are channel-shaped with a frustoconical shape having a taper starting from the outer side 40.

Furthermore, other connecting elements 42 are provided, arranged at a distance apart from each other and functionally equivalent to one another and, in the present case, in the form of latching elements 48. The latching elements 48 are latching receptacles 50. The latching receptacles 50 extend in the shape of a channel, starting from the outer side 40.

Here, the latching receptacles 50 can have a tapered configuration. The latching receptacles 50 comprise an undercut.

The connecting elements 42 are positioned such that a respective clamping element 44 and a respective latching element 48 are positioned directly laterally next to one another. Functionally equivalent clamping elements 44 and latching elements 48 are formed symmetrically about a central transverse plane 54 at the receiving device 34.

The connecting elements 42 extend starting from an end wall 56 of the frame part 20, which end wall 56 in the present case is substantially plate-shaped. The end wall 56 is set back with respect to an outer contour 58 of the frame part 20 via a step 60.

In particular, the connecting elements 42 do not extend beyond the outer contour 58.

The end wall 56 has further formed therein through-openings 62, in the present case three in number. A first through-opening 62 is arranged in the area of the central transverse plane 54, the other through-openings 62 are positioned symmetrically to one another about the central transverse plane 54. Via a respective through-opening 62, a fixing device at a functional device 36 can engage in a recess 64 arranged behind the end wall 56.

The base part 18 and the frame part 20 in the present case further comprise receiving elements for receiving the profile elements 26 and the side walls 30, in particular the doors 31.

Figure 3:
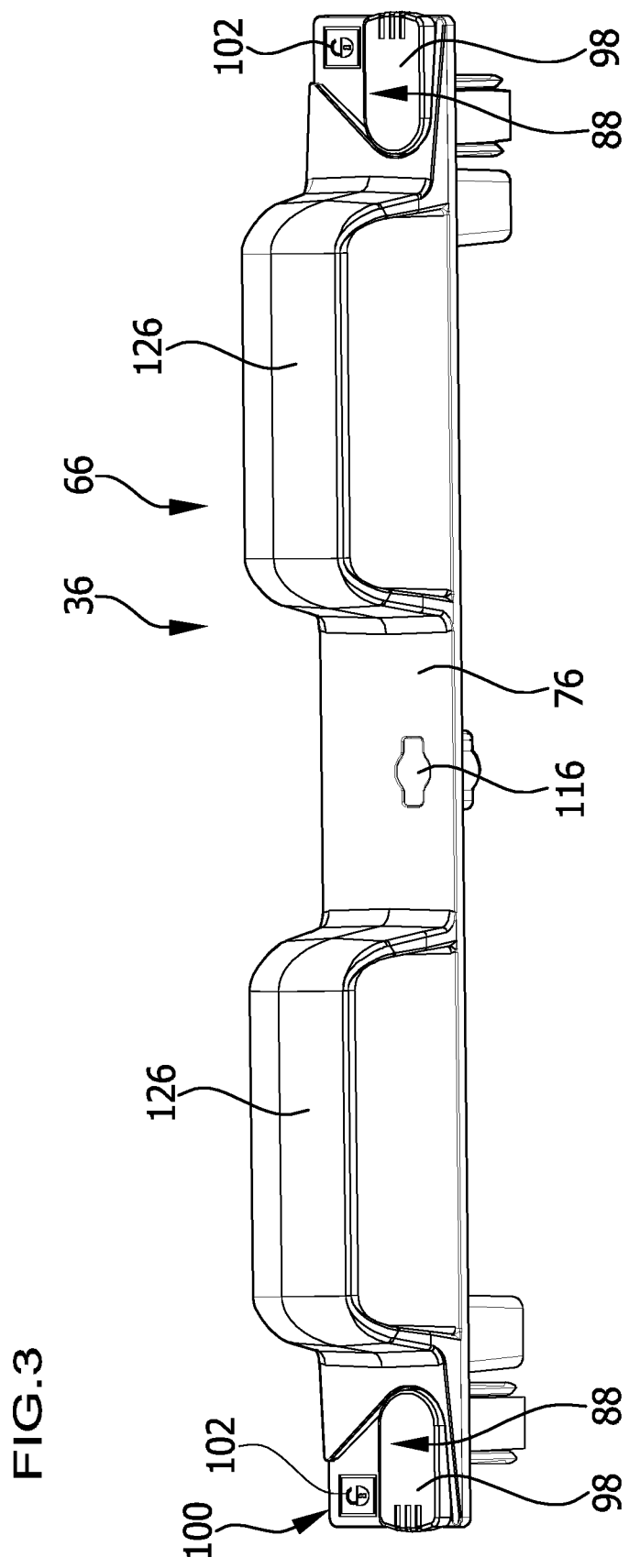
FIG. 3 illustrates a perspective representation of a functional device of the cleaning system, configured as a handle device.
Figure 15:
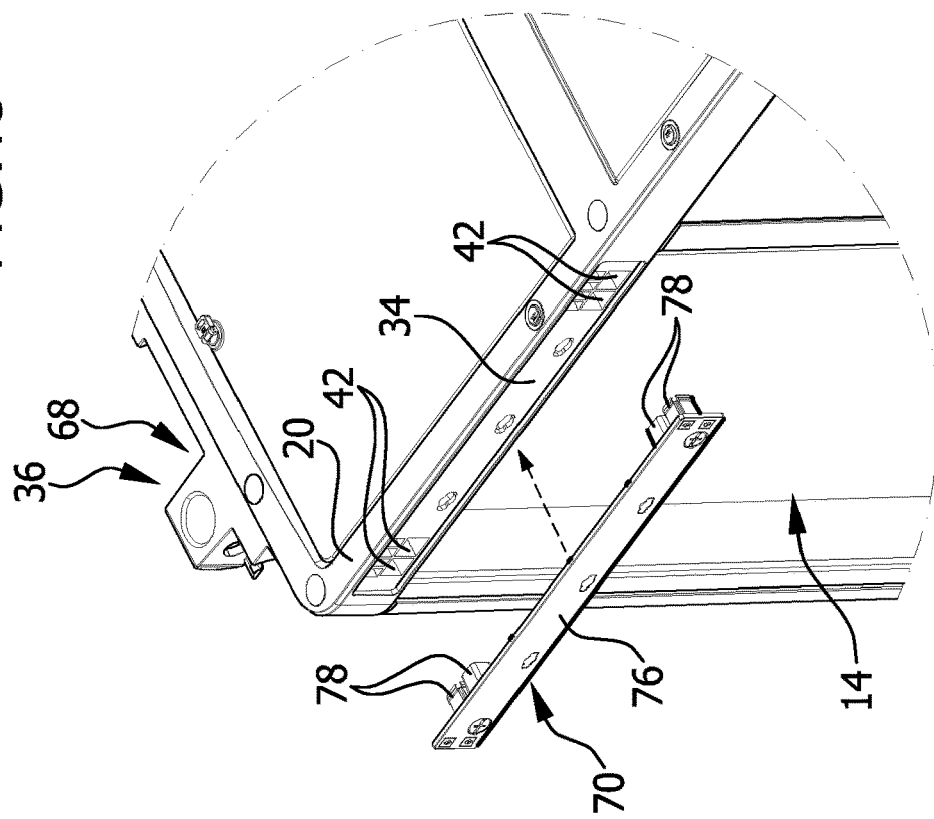
FIG. 15 illustrates a perspective partial representation of a cleaning cart, and a functional device without clamping holders fixed thereto, in the process of being connected to a receiving device of the cleaning cart.
Figure 16:
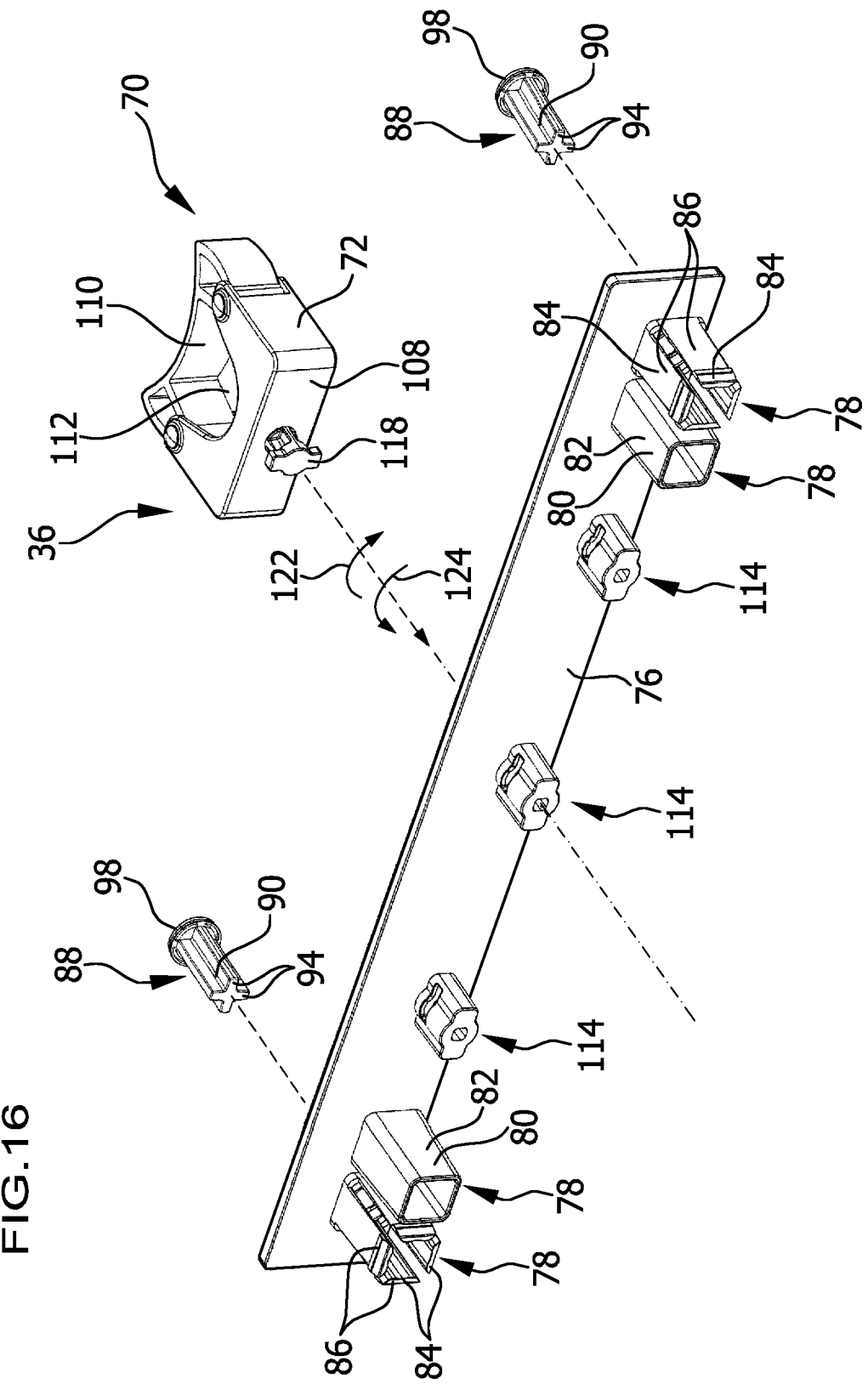
FIG. 16 illustrates a perspective partial view of the functional device of FIG. 14 in exploded representation.
Figure 17:
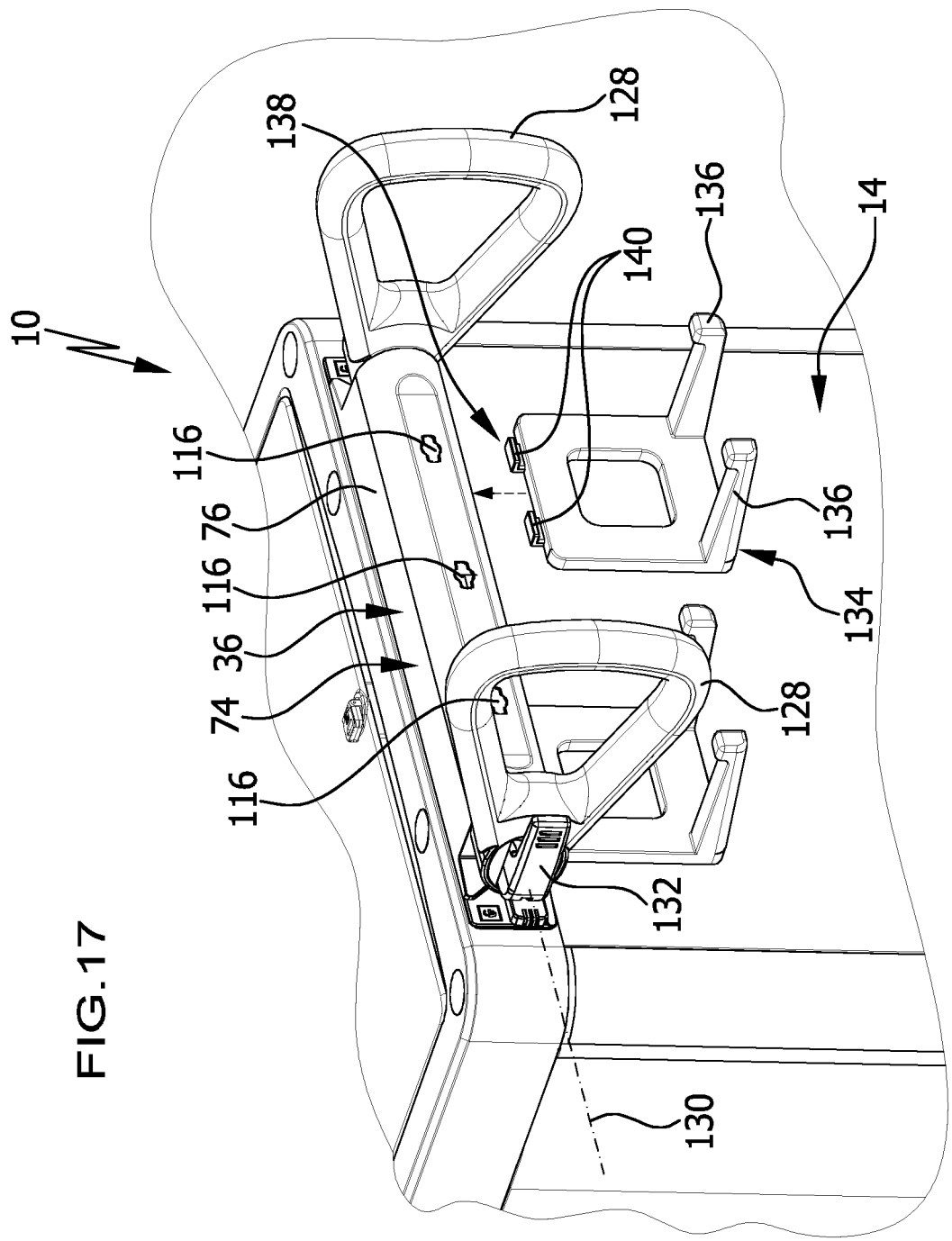
FIG. 17 illustrates a perspective partial view of a cleaning cart having a functional device in the form of a handle device.

The various functional devices 36, already mentioned, which expand the scope of application of the cleaning system 10, in the present case comprise a handle device 66 (FIGS. 3 to 5), two coupling devices 68 (FIGS. 1 and 6), an adapter device 70 with clamping holders 72 (FIGS. 14 to 16) and a handle device 74 (FIG. 17).

A respective functional device 36 is connectable to a respective receiving device 34. In particular, this gives the possibility of selectively connecting a respective functional device 36 to a respective particular receiving device 34. The cleaning system 10 is thereby rendered highly versatile. For example, the selection of a desired functional device 36 can be made on the manufacturer's side by default or according to customer's preferences. Alternatively or in addition, the desired functional device can be attached to the receiving device 34 during setup of the cleaning cart 12, 14.

In each case, it can be seen that a respective functional device 36 comprises a base element 76. The base element 76 is, at least in sections thereof, dimensioned such that it can be placed in contact against the end wall 56 within the area surrounded by the step 60. Correspondingly, the base element 76 is preferably plate-shaped or comprises a plate-shaped section.

Arranged at the base element 76 are connecting elements 78. The connecting elements 78 project from the base element 76 in a direction towards the receiving device 34. The connecting elements 78 are identical in each case for the functional devices 36 to enable connection thereof to the receiving device 34.

In the present case, the connecting elements 78 correspond to the connecting elements 42. In particular, the possibility exists for the respective functional device 36 to be releasably connected to the respective receiving device 34. Here, both the connecting and the releasing can be effected by hand and without tools. The cleaning system 10 is thereby rendered particularly easy to handle and versatile. For example, the possibility exists of removing unused functional devices 36. Alternatively or in addition, provision can be made for the user to use the functional device(s) that is or are best suited to the user's preferences and/or the cleaning task to be performed.

Figure 4:
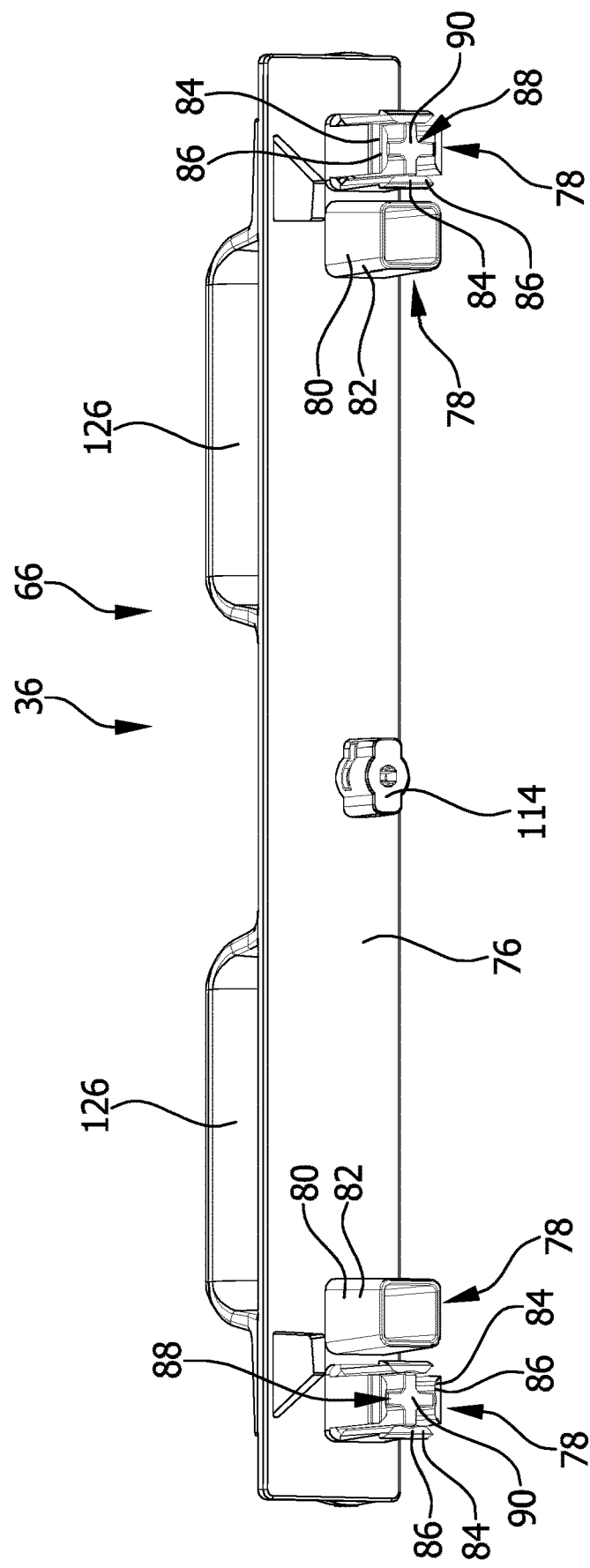
FIG. 4 illustrates a further perspective representation of the handle device of FIG. 3.

As can be seen from FIGS. 4 and 16 in particular, using the example of the handle device 66 and the example of the adapter device 70, the connecting elements 78 comprise a pair of functionally equivalent clamping elements 80 arranged at a distance apart from each other at the base element 76 and in the present case configured as clamping projections 82. The clamping projection 82 has an approximately frustoconically shaped configuration and conforms in its shape to the clamping receptacle 46.

The connecting elements 78 further comprise functionally equivalent latching elements 84 corresponding to each other and arranged at a distance apart from each other at the base element 76, in the present case configured as latching hooks 86. The latching hooks 86 are latching projections which are resiliently held to the base element 76.

In the present case, two times four latching elements 84 are provided. In each case, four latching elements 84 are arranged in grouped relation to each other laterally next to a respective clamping projection 82. In each case, two latching elements 84 are provided in opposing relation to one another.

The latching elements 84 can engage in the latching receptacles 50. Here, a respective latching element 84 extends adjacent to a respective wall of the latching receptacle 50. In each case, the latching hook 86 can latch with the latching receptacle 50 at the undercut 52 thereof.

The connecting elements 78 are arranged at the base element 76 such that the clamping elements 80 are arranged symmetrically to each other and the two ensembles of four latching elements 84 each are symmetric to each other. In the connection state of the functional device 36 to the receiving device 34, the corresponding plane of symmetry is the central transverse plane 54. The functional device 36 can have a generally symmetrical configuration relative to this plane of symmetry.

For connecting a respective functional device 36 to a receiving device 34, the clamping projections 82 are inserted into the clamping receptacles 46. In each case, four latching hooks 86 are inserted into a latching receptacle 50. The functional device 36 is moved until the base element 76 is in contact against the end wall 56. The clamping projections 82 clamp against the clamping receptacles 46, and the latching hooks 86 engage in the undercuts 52.

Conversely, to release the functional device 36, it is pulled off the receiving device 34. The latching hooks 86 and the latching receptacles 50 unlatch, and the clamping of the clamping projections 82 against the clamping receptacles 46 is released.

However, the functional devices 36 can comprise at least one blocking element 88 by way of which the latching of the latching hooks 86 with the latching receptacles 50 can be secured against unlatching. In the present case, the handle devices 66 and 74, the coupling devices 68 and the adapter device 70 each comprise blocking elements 88. However, here, the configuration of the blocking elements 88 for the adapter device 70 differs from the configuration of the blocking elements 88 for the three other functional devices 36.

Reference is first made to FIGS. 8 to 11 regarding the handle devices 66, 74 and the coupling devices 68.

Each functional device 36 comprises two blocking elements 88. Here, a respective blocking element 88 is associated with a group of four latching hooks 86.

The blocking element 88 has a blocking projection 90. The blocking projection 90 is +-shaped in cross-section and defines an axis 92.

The blocking projection 90 is arranged between the latching hooks 86. Here, the blocking projection 90 is dimensioned such that, in a blocking position of the blocking element 88, a respective segment 94 can be in contact against a latching hook 86, on a side thereof that faces away from the latching receptacle 50. This prevents the latching hook 86 from being allowed to move relative to the base element 76 and thereby become unlatched from the latching receptacle 50.

Provision can be made for the respective segment 94, in the blocking position of the blocking element 88, to apply to the latching hook 86 a blocking force directed towards the latching receptacle 50. The latching hook 86 is thereby secured to the latching receptacle 50 not only by form-locking connection via the blocking element 88 but in addition via force-locking connection.

By moving, and in particular rotating, the blocking element 88 about the axis 92, the contact between the segment 94 and the latching hook 86 can be cancelled. The angle of rotation is, for example, substantially 45°. In this case, the segments 94 are oriented such that they are arranged between latching hooks 86 that are adjacent to one another.

Once rotated, the blocking elements 88 assume a release position. In the release position, the latching hooks 86 can be moved relative to the base element 76 and thereby unlatched from the latching receptacles 50.

For connecting the functional device 36, the blocking element 88 assumes the release position so that the latching hooks 86 can resiliently deform and subsequently engage in the undercuts 52. The blocking element 88 can be transferred to the blocking position by rotation about the axis 92.

As a result, in addition to the clamping and latching connection of the functional device 36 to the receiving device 34, further securement of the functional device 36 is ensured via the blocking elements 88.

The blocking projection 90 extends through a through-opening 96 formed in the base element 76. On the side facing away from the receiving device 34, the blocking element 88 has an actuating element 98, in the present case a projection oriented away from the blocking projection 90 in a direction transverse to the axis 92. The actuating element 98 facilitates to the user the handling of the blocking element 88.

As can be seen from FIGS. 5, 6, 12 and 17 in particular, the respective functional device 36 has an indicating device 100. The indicating device 100 comprises pictograms 102, 104 arranged at the base element 76, for example embossed or integrally formed thereon.

The pictograms 102, 104 are arranged such that they can be covered by the actuating element 98. Depending on what position the actuating element 98 is in, the pictogram 102, 104 that symbolizes the position of the blocking element 88 is covered.

Figure 5:
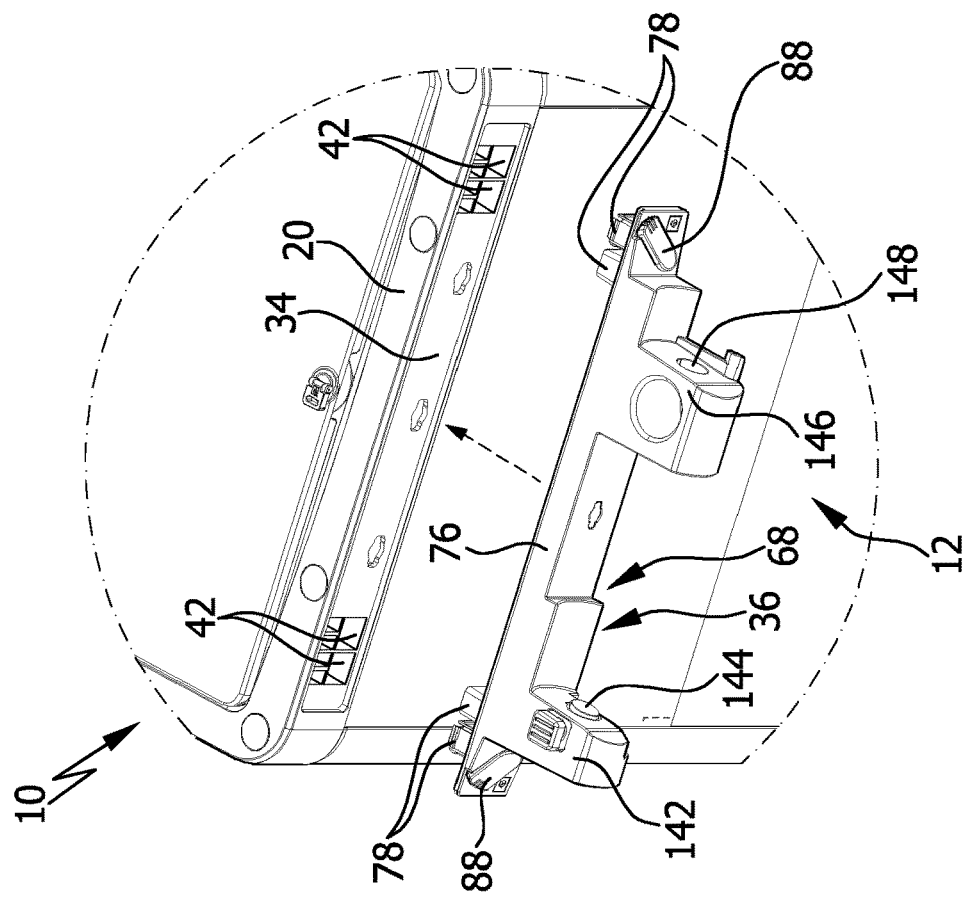
FIG. 5 illustrates, in perspective representation, how the handle device of FIG. 3 is fixed to a receiving device of a cleaning cart.
Figure 6:
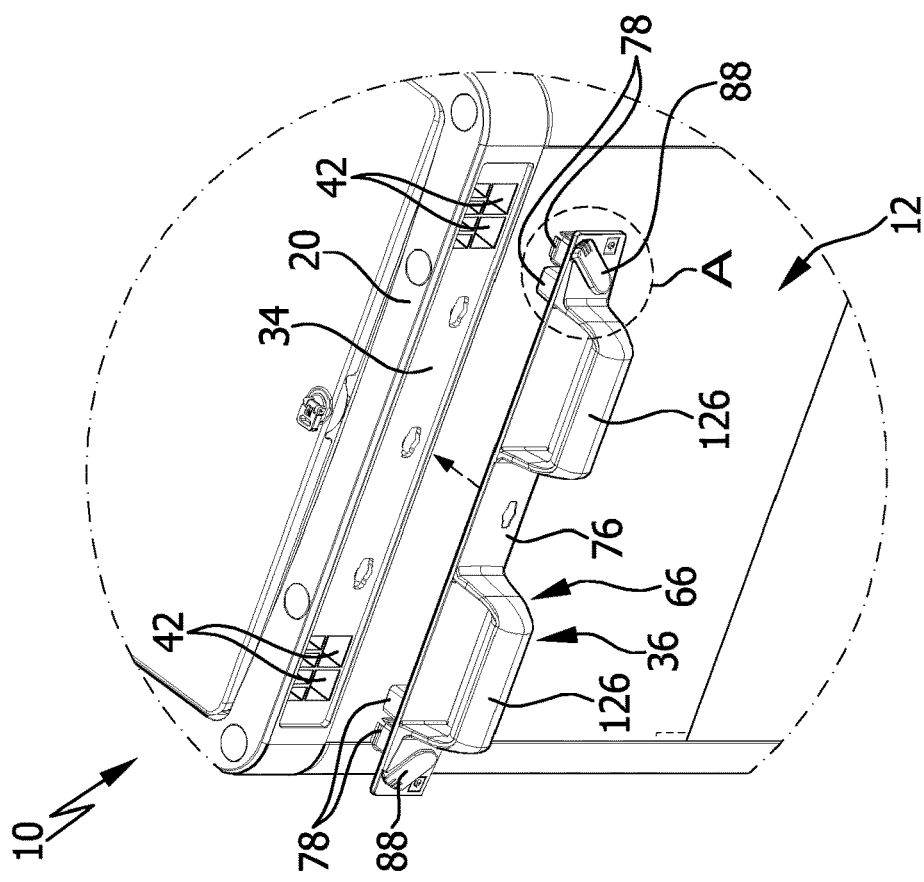
FIG. 6 illustrates a representation corresponding to FIG. 5, wherein, in lieu of the handle device, a coupling device is being connected to the receiving device.

The pictogram 102 is an open lock, whereby the release position of the blocking element 88 is symbolized. The release position is assumed when the functional device 36 is being connected to the receiving device 34 (FIGS. 5 and 6). The pictogram 104 is a closed lock, this being indicative of the blocking element 88 assuming the blocking position. The pictogram 104 is covered when the functional device 36 has been connected to the receiving device 34 and the blocking element 88 assumes the blocking position (FIG. 17).

Differently from what has been described above, the blocking elements 88 in the adapter device 70 have a different type of actuating element 98. The actuating element 98 is of disk-shaped configuration and engages in the through-opening 96. On the side of the actuating element 98 that faces away from the receiving device 34, a slot-shaped or cross-slot-shaped recess 106 can be formed (FIG. 14).

A user can engage the recess 106 by inserting for example a fingernail, a coin or a screwdriver in order to rotate the blocking element 88 about the axis 92.

In particular, here, provision can be made for the orientation of the slot in a direction towards one of the pictograms 102, 104 to indicate the state of the blocking element 88. For example, in the example of FIG. 14, the recess 106 points to the closed lock of the pictogram 104, this being indicative of the blocking position of the blocking element 88.

Figure 14:
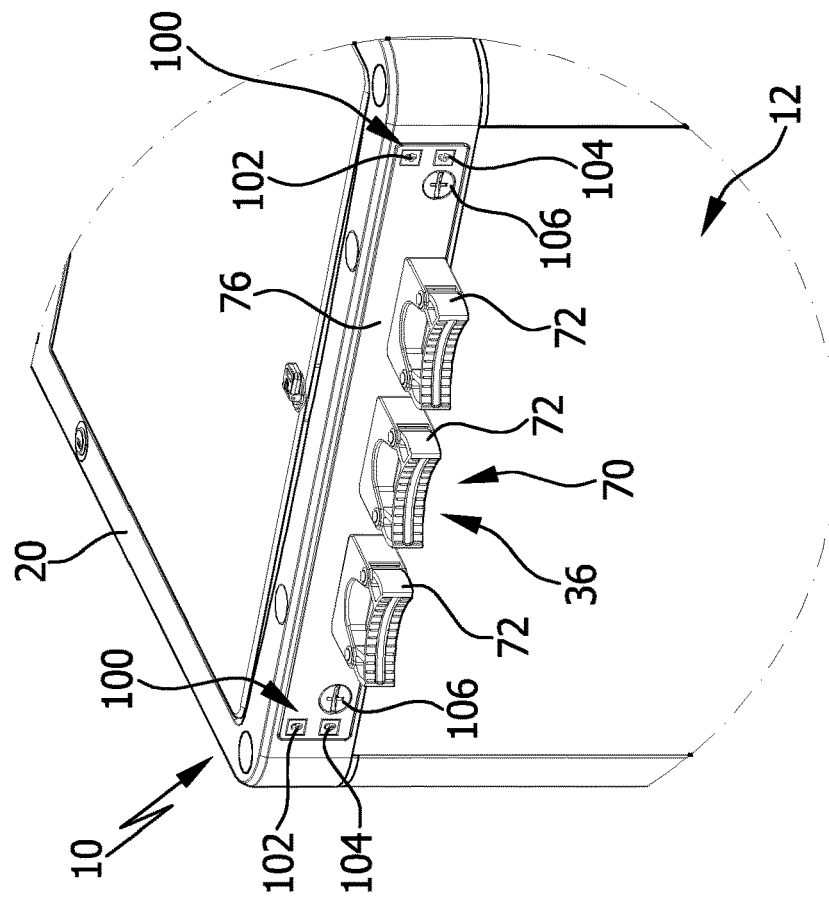
FIG. 14 illustrates a perspective partial representation of a cleaning cart and a functional device which comprises clamping holders for cleaning utensils.

As can be seen from FIGS. 14 and 16, the adapter device 70 comprises at least one clamping holder 72. Of these, only one clamping holder 72 is shown in FIG. 16. In total, a maximum of three clamping holders 72 can be connected to the receiving device 34 via the adapter device 70, although this number could be different.

The clamping holder 72 comprises a base element 108 and, held thereto, a variable-shape, and in particular elastically deformable, holding part 110. The holding part 110 is configured to assume a release position (FIGS. 14 and 16). In the release position, cleaning utensils, such as the handle of a cleaning tool, can be placed in contact against the holding part 110. With the application of force, the holding part 110 can snap over from the expanded release position to a holding position in which it at least partially engages behind the cleaning utensil. The cleaning utensil is thereby held to the clamping holder 72. Here, the cleaning utensil engages (not shown) in a recess 112 at the base element 108.

Conversely, the cleaning utensil can be removed by pulling thereon. Here, the holding part 110 deforms and snaps from the holding position into the release position.

For fixing a respective clamping holder 72, the adapter device 70 has a fixing device 114. The fixing device 114 is arranged at the base element 76 on the side thereof that faces towards the receiving device 34. A through-opening 116 associated with the fixing device 114 is provided at the base element 76.

The clamping holder 72 comprises a projection 118. In the present case, the projection 118 is arranged at the base element 108, on the side thereof that faces away from the holding part 110.

The fixing device 114 and the projection 118 are configured to be connected by way of a bayonet style push-and-twist connection.

To this end, the projection 118 is inserted through the through-opening 116 into the fixing device 114 and rotated substantially 90° with respect to an axis 120 defined by the direction of insertion. The projection 118 is thereby locked to the fixing device 114. It is advantageous here if a spring element is provided to make unintentional unlocking more difficult.

In the target position of the clamping holder 72 as shown in the exploded representation of FIG. 16, the clamping holder 72 would first have to be rotated through 90° about the axis 120, the projection 118 inserted into the fixing device 114, followed by rotating the clamping holder 72 through 90° again (arrows 122, 124).

In the connection state of the adapter device 70, the fixing device 114 extends through the through-opening 62 and engages in the recess 64.

It is advantageous for the clamping holders 72 to be releasably connectable to the adapter device 70. Depending on the cleaning task to be performed and/or preferences of the user, the required number of clamping holders 72 can be carried at the desired position. In particular, the clamping holder 72 can be connected to and released from the fixing device 114 by hand and without tools.

As can be seen from FIGS. 3 to 6, 9 and 17 in particular, at least one clamping holder 72 can also be attached to the handle device 66, the respective coupling device 68 and the handle device 74.

By way of example, the handle device 66 comprises one fixing device 114.

The coupling device 68 likewise comprises one fixing device 114 (not illustrated), FIG. 6 shows the through-opening 116 associated therewith.

The handle device 74 allows up to three clamping holders 72 to be connected. In

FIG. 17, the corresponding fixing devices 114 are not illustrated, but the through-openings 116 associated therewith are shown.

The coupling device 68 and the handle device 74 have a socket-shaped base element (FIGS. 6 and 17). Said base element 76 is dimensioned such that the fixing device(s) 114, in the connection state of the coupling device 68 and the handle device 74, is (are) arranged outside the receiving device 34.

In the following, the handle devices 66 and 74 and the coupling device 68 will be discussed.

The handle device 66 has two handle elements 126. The handle elements 126 are fixedly and non-movably arranged at the base element 76.

In the present case, the handle elements 126 are oriented in a plane parallel to the contact plane. The user can vertically grasp around the handle elements 126 when adopting a horizontal hand pose.

The handle device 74 comprises two handle elements 128 arranged at a distance apart from each other at the base element 76. The handle elements 128 are oriented perpendicularly to the contact plane, in particular vertically. For example, the user can horizontally grasp around the handle elements 126 when adopting a vertical hand pose.

The handle elements 128 can be pivoted in common about a pivot axis 130, relative to the base element 76. The pivot axis 130 is oriented parallel to the contact plane. This allows the user to adjust the handle elements 128 in height and thereby adjust them to the user's body height.

A securing device 132 is provided in order to secure the handle elements 128 against pivoting relative to the base element 76. In the present case, the securing device 132 is configured as a quick-action clamping device which can preferably be operated by the user by hand and without tools.

In the present case, the cleaning system 10 comprises at least one holding part 134 for cleaning utensils. FIG. 17 illustratively shows two holding parts 134.

The respective holding part 134 comprises two hook elements 136 for suspending cleaning utensils therefrom.

It is advantageous for the holding part 134 to be fixable to the cleaning cart 12, 14 via a functional device 36, in the present example the handle device 74. To this end, the holding part 134 comprises a holding section 138. The holding section 138 in the present case comprises two projections 140, configured as hooks. Via the projections 140, the holding section 138 can preferably engage in a form-locking manner in a recess formed between the base element 76 and the receiving device 34. The projection 140 is hooked onto the base element 76.

Depending on the needs of the user and/or cleaning utensils to be carried along, the holding part 134 can selectively be attached to the cleaning cart 12, 14 by being positioned between the functional device 36 and the cleaning cart 12, 14, or removed from there.

As can be seen from FIGS. 1 and 6 in particular, the cleaning system 10 in the present case comprises two coupling devices 68. The coupling devices 68 are preferably configured as identical parts. Each coupling device 68 can be connected to one of the receiving devices 34. If a coupling device 68 is attached to each cleaning cart 12, 14, the cleaning carts 12, 14 can be connected together via the coupling devices 68.

In particular, a releasable connection is provided so that the cleaning carts 12, 14 can be separated from each other again as required. FIG. 1 shows a connection state of the two cleaning carts 12, 14.

In particular, the connection of the coupling devices 68 to each other and their release from one another can be accomplished by hand and without tools.

For connecting the coupling devices 68, each of them has, at a socket section 142 thereof, a locking element 144 in the form of a pin. A corresponding locking element 148 in the form of a receptacle for the pin is provided on a further socket section 146. The coupling devices 68 are positioned relative to each other such that a respective pin can engage in the respective receptacle. When the pin is removed from the receptacle, the coupling devices 68 can be released from one another.

The cleaning system 10 can comprise at least one cover device 150 (FIG. 13). Preferably, a plurality of cover devices 150 can be provided, Each cover device 150 comprises connecting elements 152 that can couple to the connecting elements 42. In the present example, the connecting elements 152 are two latching hooks which are configured identically to the latching hooks 86.

The latching hooks project from a plate-shaped cover element 154 which is dimensioned such that it can be placed in contact against the end wall 56, in surrounded relation to the step 60. The latching hooks latch with the latching receptacles 50. The receiving device 34 is covered via the cover element 154. This is illustratively shown in FIG. 2 at side 39, at the top of the cleaning cart 12, and in FIG. 1 at side 38, at the bottom of the cleaning cart 12, 14.

LIST OF REFERENCE CHARACTERS 10 cleaning system
12, 14 cleaning cart
16 frame
18 base part
20 frame part
22 roller
24 supporting surface
26 profile element
28 corpus
30 side wall
31 door
32 top wall
34 receiving device
36 functional device
38, 39 side
40 outer side
42 connecting element
44 clamping element
46 clamping receptacle
48 latching element
50 latching receptacle
52 undercut
54 central transverse plane
56 end wall
58 outer contour
60 step
62 through-opening
64 recess
66 handle device
68 coupling device
70 adapter device
72 clamping holder
74 handle device
76 base element
78 connecting element
80 clamping element
82 clamping projection
84 latching element
86 latching hook
88 blocking element
90 blocking projection
92 axis
94 segment
96 through-opening
98 actuating element
100 indicating device
102, 104 pictogram
106 recess
108 base element
110 holding part
112 recess
114 fixing device
116 through-opening
118 projection
120 axis
122, 124 arrow
126, 128 handle element
130 pivot axis
132 securing device
134 holding part
136 hook element
138 holding section
140 projection
142 socket section
144 locking element
146 socket section
148 locking element
150 cover device
152 connecting element
154 cover element

What is claimed is:

1. Cleaning system comprising a hand-guided cleaning cart which comprises rollers and is movable over a supporting surface, for transporting and storing cleaning utensils for manual cleaning, wherein the cleaning system comprises at least one receiving device arranged at the cleaning cart and two or more different functional devices for at least one of operation and use of the cleaning system, wherein the functional devices are selectively connectable to the at least one receiving device, wherein the at least one receiving device and the functional devices comprise cooperating connecting elements, wherein at least one of the functional devices comprises a coupling device for coupling the cleaning cart to a further cleaning cart of the cleaning system, and wherein the cleaning system comprises at least one further cleaning cart which comprises a receiving device and a functional device in the form of a coupling device which is connected to the receiving device of the further cleaning cart, and wherein the cleaning carts are connectable together via the intercoupling coupling devices.

2. Cleaning system in accordance with claim 1, wherein the cleaning system comprises at least one of more than two different functional devices and a plurality of identically configured functional devices.

3. Cleaning system in accordance with claim 1, wherein the cleaning system comprises two or more cleaning carts, and wherein at least one receiving device is arranged at the respective cleaning cart, wherein at least one of the functional devices is selectively connectable to a receiving device of one of the cleaning carts.

4. Cleaning system in accordance with claim 1, wherein the functional devices comprise at least one handle device having at least one element for the user.

5. Cleaning system in accordance with claim 4, wherein at least one of the following applies:
 a handle device is provided in which the at least one handle element is arranged at the functional device in a non-movable manner;
 a handle device is provided in which the at least one handle element is adapted to be moved relative to a base element comprised by the handle device.

6. Cleaning system in accordance with claim 5, wherein the at least one movable handle element is pivotable about a pivot axis relative to the base element, which pivot axis is oriented parallel to a contact plane of the cleaning cart defined by the rollers.

7. Cleaning system in accordance with claim 6, wherein the handle device comprises or forms a securing device for securing the handle element against movement relative to the base element.

8. Cleaning system in accordance with claim 4, wherein at least one of the following is provided:
 a handle device is provided in which the at least one handle element is oriented in a plane parallel to a contact plane of the cleaning cart defined by the rollers;
 a handle device is provided in which the at least one handle element is oriented in a plane transverse to a contact plane of the cleaning cart defined by the rollers.

9. Cleaning system in accordance with claim 1, wherein at least one of the coupling devices and the receiving devices of the two cleaning carts are of identical configuration.

10. Cleaning system in accordance with claim 1, wherein the cleaning system comprises at least one clamping holder for cleaning utensils which has an elastically deformable holding part that can be transferred from a holding position in which it at least partially engages behind the cleaning utensil to an expanded release position in which the cleaning utensil is removable from the clamping holder and insertable therein.

11. Cleaning system in accordance with claim 10, wherein the at least one clamping holder is fixed or fixable to at least one of the at least one functional device and the at least one receiving device, at least one of the at least one functional device and the at least one receiving device comprising at least one fixing device for fixing the at least one clamping holder.

12. Cleaning system in accordance with claim 11, wherein the at least one clamping holder is releasably connectable to at least one of the at least one functional device and the at least one receiving device via the at least one fixing device.

13. Cleaning system in accordance with claim 11, wherein the fixing device and a projection arranged at the at least one clamping holder are configured to connect together in a push-and-twist type connection, wherein the projection is insertable in the fixing device in an insertion direction and lockable to the fixing device by rotation about an axis oriented in the insertion direction.

14. Cleaning system in accordance with claim 12, wherein the fixing device is arranged at the at least one functional device which comprises a base element having at least one through-opening, and wherein the holding part, in the state of being fixed to the fixing device, and the fixing device are arranged on sides of the base element that face away from each other, and wherein the projection extends through the through-opening.

15. Cleaning system in accordance with claim 12, wherein the at least one receiving device comprises or forms at least one recess in which the fixing device engages in a connection state of the at least one functional device to the receiving device.

16. Cleaning system in accordance with claim 1, wherein the cleaning system comprises at least one holding part for cleaning utensils, which holding part has at least one hook element for suspending the cleaning utensil therefrom, wherein the at least one holding part is fixable to the cleaning cart via at least one functional device.

17. Cleaning system in accordance with claim 16, wherein the at least one holding part, with at least one holding section thereof, engages in a recess which is formed between the at least one functional device assuming a connection state and the cleaning cart, and wherein the holding part is hangingly fixed to at least one of the functional device and the receiving device via the at least one holding section.

18. Cleaning system in accordance with claim 1, wherein the cleaning system comprises at least one cover device which is connectable to the receiving device and which covers connecting elements arranged at the receiving device.

19. Cleaning system in accordance with claim 18, wherein the at least one cover device does not project beyond an outer contour of the cleaning cart and/or wherein the cover device aligns with an outer contour of the cleaning cart.

20. Cleaning system in accordance with claim 1, wherein at least one of the functional devices and at least one cover device which is connectable to the receiving device and which covers connecting elements arranged at the receiving device is releasably connectable to the at least one receiving device.

21. Cleaning system in accordance with claim 1, wherein at least one of the functional devices comprises at least one blocking element by way of which the functional device is secured to the receiving device against release therefrom when the blocking element assumes a blocking position, and is releasable from the receiving device when the blocking element assumes a release position.

22. Cleaning system in accordance with claim 1, wherein two or more functional devices comprise connecting elements of identical configuration.

23. Cleaning system in accordance claim 1, wherein the functional devices each comprise a base element having a first side that faces towards the at least one receiving device and on which is arranged at least one connecting element, and a second side that faces away from the first side and on which is arranged at least one of the following:
 a handle element;
 a clamping holder for cleaning utensils;
 a locking element for connecting to a further cleaning cart.

24. Cleaning system in accordance with claim 1, wherein the connecting element arranged at the at least one receiving device does not project beyond an outer contour of the cleaning cart.

25. Cleaning system in accordance with claim 1, wherein the functional devices and the at least one receiving device each comprise a plurality of functionally equivalent connecting elements, being configured as at least one of latching elements and clamping elements, which are in each case arranged at a distance apart from each other at the receiving device and at the functional device, wherein in each case two or more connecting elements of the receiving device and of a respective functional device cooperate in the connection state thereof.

26. Cleaning system in accordance with claim 1, wherein the connecting elements comprise at least one receptacle and comprise, in the connection state of the at least one functional device, at least one projection engaging in the receptacle, wherein the at least one receptacle is arranged at the at least one receiving device, and the at least one projection is arranged at the respective functional device, or vice versa.

27. Cleaning system in accordance with claim 1, wherein the connecting elements comprise clamping elements via which the at least one functional device is clampingly connected to the at least one receiving device, in particular wherein provided as clamping elements are a tapered channel-shaped clamping receptacle and a tapered frustopyramidally shaped or frustoconically shaped clamping projection which engages in the clamping receptacle in a form-locking manner.

28. Cleaning system in accordance with claim 1, wherein the connecting elements comprise latching elements via which the at least one functional device is latchingly connected to the at least one receiving device, in particular wherein latching hooks and latching receptacles are provided as latching elements which are in latching engagement one with the other.

29. Cleaning system in accordance with claim 1, wherein the functional devices comprise a base element, at least one latching projection which resiliently projects therefrom, and at least one blocking element which is movably held to the base element, wherein, when in a blocking position, the at least one blocking element is in contact against the latching projection and, when in a release position, the latching projection is out of contact with the blocking element.

30. Cleaning system in accordance with claim 29, wherein at least one of the following applies:
a plurality of latching projections are provided at the respective functional device which are in each case in contact against the at least one blocking element; the functional device comprises an indicating device for a user to determine whether the at least one blocking element assumes the blocking position or the release position.

31. Cleaning system in accordance with claim 1, wherein the cleaning cart comprises a plurality of receiving devices which are configured identically to one another.

32. Cleaning system in accordance with claim 1, wherein the cleaning cart comprises a frame.

33. Cleaning system in accordance with claim 32, wherein the at least one receiving device is arranged at the frame on the outer side thereof.

34. Cleaning system in accordance with claim 32, wherein the frame comprises a base part to which the rollers are held, and at least one frame part arranged above the base part and arranged at a distance apart from the base part, wherein at least one of the following applies:
at least one receiving device is arranged at the frame part or is formed integrally with the frame part;
at least one receiving device is arranged at the base part or is formed integrally with the base part.

35. Cleaning system in accordance with claim 34, wherein two or more receiving devices are arranged or formed at at least one of the frame part and the base part, and wherein two receiving devices are arranged at at least one of the frame part and the base part as follows:
on sides of the frame that face away from each other; and/or
on two sides of the frame that are adjacent to one another at an angle.

36. Cleaning system in accordance with claim 34, wherein at least one of the base part and the frame part are rectangular-shaped in plan view, and wherein a receiving device is arranged on each of the four sides of the rectangle thus defined.

37. Cleaning system in accordance with claim 34, wherein at least one of the base part and the frame part comprise or form at least one of the following:
receiving elements for mounting side walls and/or doors of the cleaning cart;
receiving elements for mounting profile elements via which the base part and the frame part are connected to one another.

38. Cleaning system in accordance with claim 34, wherein at least one of the base part and the frame part is formed in one piece, in particular as a moulded plastics part.

39. Cleaning system comprising a hand-guided cleaning cart which comprises rollers and is movable over a supporting surface, for transporting and storing cleaning utensils for manual cleaning, wherein the cleaning system comprises at least one receiving device arranged at the cleaning cart and two or more different functional devices for at least one of operation and use of the cleaning system, wherein the functional devices are selectively connectable to the at least one receiving device, wherein the at least one receiving device and the functional devices comprise cooperating connecting elements, and wherein the cleaning system comprises at least one cover device which is connectable to the receiving device and which covers connecting elements arranged at the receiving device, wherein the at least one cover device does not project beyond an outer contour of the cleaning cart and/or wherein the cover device aligns with an outer contour of the cleaning cart.

40. Cleaning system comprising a hand-guided cleaning cart which comprises rollers and is movable over a supporting surface, for transporting and storing cleaning utensils for manual cleaning, wherein the cleaning system comprises at least one receiving device arranged at the cleaning cart and two or more different functional devices for at least one of operation and use of the at least one cleaning cart, wherein the functional devices are selectively connectable to the at least one receiving device, wherein the at least one receiving device and the functional devices comprise cooperating connecting elements, and wherein the functional devices comprise a base element, at least one latching projection which resiliently projects therefrom, and at least one blocking element which is movably held to the base element, wherein, when in a blocking position, the at least one blocking element is in contact against the latching projection and, when in a release position, the latching projection is out of contact with the blocking element.

41. Cleaning system according to claim 1, wherein at least one of the functional devices comprises a handle device, a blocking element, a clamping holder, or a coupling device.

* * * * *